United States Patent
Sofue et al.

(10) Patent No.: US 12,304,255 B2
(45) Date of Patent: May 20, 2025

(54) TIRE

(71) Applicant: Sumitomo Rubber Industries, Ltd., Hyogo (JP)

(72) Inventors: Naoya Sofue, Kobe (JP); Takuma Yoshizumi, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

(21) Appl. No.: 18/255,548

(22) PCT Filed: Sep. 17, 2021

(86) PCT No.: PCT/JP2021/034236
§ 371 (c)(1),
(2) Date: Jun. 1, 2023

(87) PCT Pub. No.: WO2022/123853
PCT Pub. Date: Jun. 16, 2022

(65) Prior Publication Data
US 2024/0010033 A1    Jan. 11, 2024

(30) Foreign Application Priority Data
Dec. 7, 2020    (JP) .................... 2020-202541

(51) Int. Cl.
*B60C 23/04* (2006.01)
*B60C 11/00* (2006.01)

(52) U.S. Cl.
CPC ...... *B60C 23/0493* (2013.01); *B60C 11/0008* (2013.01); *B60C 2011/0025* (2013.01); *B60C 2011/0033* (2013.01); *B60C 2200/04* (2013.01)

(58) Field of Classification Search
CPC ............ B60C 11/0025; B60C 23/0493; B60C 2019/004; B60C 19/00; B60C 2019/002; B60C 2019/003
See application file for complete search history.

(56) References Cited

U.S. PATENT DOCUMENTS

| 5,500,065 A * | 3/1996 | Koch ............... B60C 23/0442 156/123 |
| 2011/0100521 A1 * | 5/2011 | Sakamoto ............ B60C 11/04 152/209.24 |

(Continued)

FOREIGN PATENT DOCUMENTS

| JP | 2003291610 A * | 10/2003 |
| JP | 2004-155352 A | 6/2004 |
| JP | 2018168300 A * | 11/2018 |

OTHER PUBLICATIONS

English machine translation of JP-2018168300-A. (Year: 2018).*

(Continued)

*Primary Examiner* — Robert C Dye
(74) *Attorney, Agent, or Firm* — Studebaker Brackett PLLC

(57) ABSTRACT

A pneumatic tire (1) includes: a tread portion (2) including a land portion (24) divided by a plurality of main grooves (22) formed on a tread surface (21); and a mount member (10) which is provided on a tire inner surface (7A) on an inner side of the tread portion (2), and to which electric equipment can be attached. The mount member (10) is disposed on the tire inner surface (7A) at a position corresponding to the land portion (24). Complex elastic modulus E*1 of a rubber composition constituting the mount member (10) is larger than complex elastic modulus E*2 of a rubber composition constituting the tread portion (2).

10 Claims, 5 Drawing Sheets

(56) References Cited

U.S. PATENT DOCUMENTS

2020/0376897 A1* 12/2020 Bourgeois ............. B60C 11/033
2021/0070117 A1*  3/2021 Giannini ............. B60C 23/0493
2021/0276374 A1*  9/2021 Puppi ................... B60C 23/041
2022/0055424 A1*  2/2022 Puppi ...................... C09J 7/383

OTHER PUBLICATIONS

English machine translation of JP-2003291610-A. (Year: 2003).*
International Search Report issued in PCT/JP2021/034236; mailed Dec. 7, 2021.
Written Opinion of the International Searching Authority issued in PCT/JP2021/034236; mailed Dec. 7, 2021.

* cited by examiner

TIRE

TECHNICAL FIELD

The present disclosure relates to a tire mounted on a vehicle.

BACKGROUND ART

Conventionally, there has been proposed a tire pressure monitoring system (TPMS) for detecting and monitoring an air pressure (tire pressure) of a tire mounted on a vehicle (see PTL 1). The tire is attached with a sensor unit composed of: a sensor configured to detect a tire pressure; and a transmitter configured to transmit a detection value of the tire pressure. The tire pressure monitoring system monitors the change of the tire pressure based on a signal transmitted from the sensor unit.

CITATION LIST

Patent Literature

[PTL 1] Japanese Patent Application Publication No. 2004-155352

SUMMARY OF THE INVENTION

Problems to be Solved by the Invention

Meanwhile, in recent years, for safe and comfortable driving of a vehicle, it is considered important to appropriately detect and manage tire information that include not only the tire pressure, but temperature or vibration of the tire, and wear state of a tread portion of the tire. To detect the tire information, electric equipment such as a sensor for detecting the tire information may be attached to the tire. To acquire the tire information accurately, the electric equipment is preferably attached to an inner surface of the tire. For example, the electric equipment is fixed to a part of an area of the tire inner surface corresponding to a rear surface of the tread portion.

However, when a vehicle with a tire whose inner surface is attached with the electric equipment travels, the electric equipment receives a contact pressure from the road surface via the tread portion each time the tire makes one round. That is, the electric equipment receives the contact pressure periodically while the vehicle is travelling. This may cause a contact sound to be generated from the tire periodically. This contact sound may become a cause of a noise (noisy sound, noise, etc.), such as a road noise, that is generated while the vehicle is travelling. In addition, a periodical application of a load of the electric equipment to the road surface via the tread portion may cause a vibration of the tread portion. This vibration, too, may become a cause of the noise or the like. The contact sound and the vibration are considered to remarkably appear during high-speed travelling of the vehicle.

It is an object of the present disclosure to, in a tire including a mount member to which electric equipment such as a sensor can be attached, restrict a noise (noisy sound, noise, etc.) from being generated during high-speed travelling of a vehicle.

Solution to the Problems

A tire according to an aspect of the present disclosure includes: a tread portion including a land portion divided by a recessed groove formed on a surface; and a mount member which is provided on a tire inner surface that is on an inner side of the tread portion, and to which electric equipment can be attached. The mount member is disposed on the tire inner surface at a mounting position corresponding to the land portion. Complex elastic modulus $E*1$ of a first rubber composition constituting the mount member is larger than complex elastic modulus $E*2$ of a second rubber composition constituting the tread portion.

With the above-described configuration, even in a tire having a mount member attached with electric equipment, it is possible to restrict a noise caused by load of the mount member and the electric equipment.

Advantageous Effects of the Invention

According to the present disclosure, it is possible to, in a tire including a mount member to which electric equipment such as a sensor can be attached, restrict a noise (noisy sound, noise, etc.) from being generated during high-speed travelling of a vehicle.

DESCRIPTION OF EMBODIMENTS

The following describes an embodiment of the present disclosure with reference to the accompanying drawings. It should be noted that the following embodiment is an example of a specific embodiment of the present disclosure and should not limit the technical scope of the present disclosure.

Figure 1:
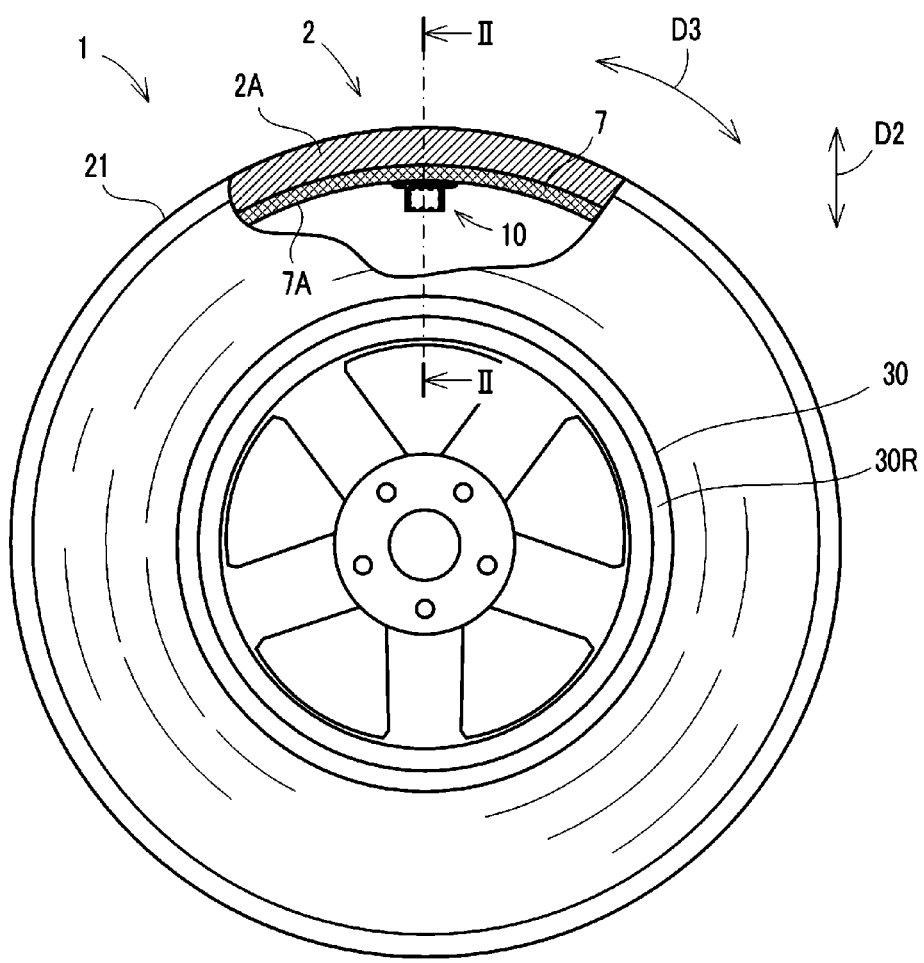
FIG. 1 is a side diagram of a tire according to an embodiment of the present disclosure.
Figure 2:
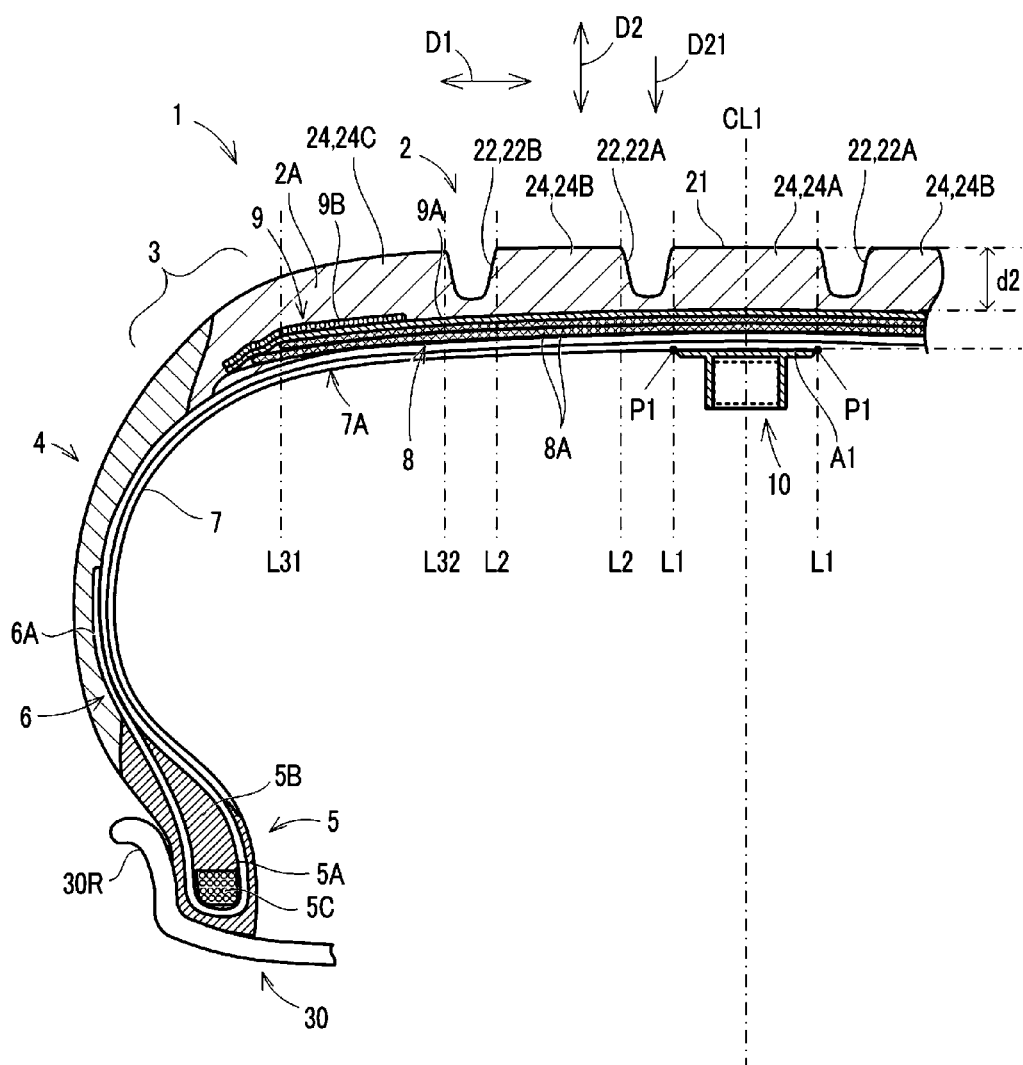
FIG. 2 is a partial cross-sectional diagram of the tire, showing a cross section taken along a plane II-II shown in FIG. 1.

FIG. 1 is a side diagram of a pneumatic tire 1 (hereinafter, merely referred to as "tire 1") according to an embodiment of the present disclosure, viewed from a side thereof. FIG. 2 is a cross-sectional diagram of the tire 1 taken along a cut plane II-II shown in FIG. 1. FIG. 1 partially shows a cross-sectional structure of an equator plane CL1 (see FIG. 2). Here, an up-down direction when viewed on the paper in FIG. 1 and FIG. 2 is a radial direction D2 of the tire 1. A left-right direction when viewed on the paper in FIG. 2 is a width direction D1 of the tire 1. In addition, an arrow D3 shown in FIG. 1 is a peripheral direction of the tire 1. It is noted that since the tire 1 is formed symmetrical to the width direction D1 with respect to the equator plane CL1, FIG. 2 shows a partial cross-sectional diagram of the tire 1, omitting the other part.

The tire 1 has a rubber material as a main component and is mainly used mounted on a vehicle such as an automobile. As shown in FIG. 1 and FIG. 2, the tire 1 is built in a rim 30R of a wheel 30. The rim 30R is a normal rim that is described below. Air is filled inside the tire 1, and the inner pressure thereof is adjusted to a normal inner pressure that is described below.

In the present specification, a state where the inner pressure of the tire 1 built in the rim 30R is adjusted to the normal inner pressure and no load is applied to the tire 1, is referred to as a normal state. FIG. 1 and FIG. 2 show the tire 1 in the normal state, mounted on the wheel 30. In the present embodiment, unless specifically mentioned, shapes of the tire 1 and each part thereof are shapes in the normal state, and the dimension and angle of the tire 1 and each part thereof are measured in the normal state.

Here, the normal rim is a rim specified by a standard on which the tire 1 is based. Specifically, the normal rim is the "standard rim" specified by a standard (JATMA standard) of JATMA (The Japan Automobile Tyre Manufacturers Association, Inc.), the "design rim" specified by a standard (TRA standard) of TRA (The Tire and Rim Association, Inc.), and the "measuring rim" specified by a standard (ETRTO standard) of ETRTO (European Tyre Rim Technical Organisation).

The normal inner pressure is an inner pressure specified by a standard on which the tire 1 is based. Specifically, the normal inner pressure is the "maximum air pressure" specified by the JATMA standard, is the "maximum value" shown in "Tire load limits at various cold inflation pressures" of the TRA standard, and is "inflation pressure" in the ETRTO standard.

The tire 1 according to the present embodiment is suitably used as a radial tire for automobiles. It is noted that the tire 1 is a pneumatic tire for use in a vehicle, and not limited to use in automobiles, the tire 1 may be a pneumatic tire for use in various types of vehicles such as a passenger car, a large-sized vehicle such as a truck or a bus, a motorcycle, a racing vehicle, an industrial vehicle, a special vehicle, or a vehicle for loading such as a trailer or a carriage. In addition, the tire 1 is not limited to a radial tire, but is suitably used as a bias tire, too. In particular, the tire 1 is suitably used as a tire for use in a passenger car in which various types of electric equipment such as a sensor are installed, and which is required to have high convenience and low noise property during high-speed travelling. It is noted that the tire for passenger car refers to a tire mounted on an automobile that travels with four wheels, and the maximum load capacity is 1,000 kg or less.

The maximum load capacity is not particularly limited as far as it is 1,000 kg or less, but in general, as the maximum load capacity increases, the tire weight tends to increase, a vibration that occurs to a tread portion 2 of the tire 1 increases, and the noise during travelling tends to increase. As a result, the maximum load capacity is preferably 900 kg or less, more preferably 800 kg or less, and still more preferably 700 kg or less.

In addition, from a viewpoint of alleviating the vibration at the tread portion 2, the tire weight of the tire 1 is preferably 20 kg or less, more preferably 15 kg or less, and still more preferably 12 kg or less, 10 kg or less, or 8 kg or less. It is noted that the tire weight includes weights of the electric equipment and a mount member 10 described below, and in a case where sealant or sponge is provided in an inner space part of the tire 1, the tire weight includes the weight thereof, as well.

As shown in FIG. 2, the tire 1 includes the tread portion 2, a pair of shoulder portions 3 provided at opposite positions of the tread portion 2 in the width direction D1, a pair of side wall portions 4 that extend from the shoulder portions 3 in a center direction D21 directed toward the center axis of the tire 1 (inner side in the radial direction D2), and a pair of bead portions 5 located at ends of the side wall portions 4 on the side of the center direction D21.

Furthermore, the tire 1 includes: a carcass 6 that extends from the tread portion 2 to bead cores 5A of the bead portions 5 via the shoulder portions 3 and the side wall portions 4; an inner liner 7 that constitutes an inner surface 7A of the tire 1; a belt portion 8 and a band portion 9 that are disposed at the inside of the tread portion 2 in the radial direction D2; and a mount member 10 mounted to the inner surface 7A of the tire 1.

The tread portion 2 is configured to contact the road surface during travelling of the vehicle. The tread portion 2 includes a tread rubber 2A that is composed of a vulcanized rubber composition (vulcanized rubber). The outer surface of the tread portion 2 is a tread surface 21 being a contact surface to contact the road surface. In the present embodiment, the tread surface 21 is an approximately flat surface with respect to the width direction D1. That is, the tire 1 is formed such that the tread portion 2 is in a flat shape with respect to the width direction D1.

A rubber composition (second rubber composition) that constitutes the tread rubber 2A includes a rubber component, as well as a reinforcing agent such as silica or carbon black, and an additive such as oil, a resin component, wax, an anti-aging agent, zinc oxide, stearic acid, sulfur, or a vulcanization accelerator.

Examples of the rubber component include general rubber materials, such as an isoprene-based rubber, a butadiene rubber (BR), a styrene-butadiene rubber (SBR), a styrene-isoprene rubber, a styrene-isoprene-butadiene rubber (SIBR), an isoprene-butadiene rubber, an acrylonitrile-butadiene rubber (NBR), an acrylonitrile-styrene-butadiene rubber, a chloroprene rubber (CR), or chlorosulfonated polyethylene. In addition, in the rubber component, one of the above-mentioned rubber materials may be used alone, or two or more of the rubber materials may be used in combination, blended at a predetermined blend ratio. In particular, the rubber component is preferably an isoprene-based rubber, BR, or SBR.

SBR is not particularly limited, and, for example, those commonly used in the tire industry such as emulsion polymerized SBR (E-SBR) or solution polymerized SBR (S-SBR) can be used. These may be used alone or in combination of two or more.

The amount of styrene in SBR is preferably 10% by mass or more, more preferably 15% by mass or more, still more preferably 20% by mass or more, and particularly preferably 25% by mass or more, and is preferably 50% by mass or less, more preferably 45% by mass or less, still more preferably 40% by mass or less, and particularly preferably 30% by mass or less.

The SBR may be unmodified SBR or modified SBR. In particular, modified SBR is preferable. With use of modified SBR, more excellent low fuel consumption is obtained. The modified SBR may be any SBR having a functional group that interacts with a filler such as silica. Examples of the modified SBR include: a terminal-modified SBR in which at least one terminal has been modified with a compound (modifier) having the functional group (terminal-modified SBR having the functional group at a terminal); a main-chain-modified SBR that contains a functional group at a main chain; a main-chain-terminal-modified SBR that contains a functional group at a main chain and a terminal (for example, a main-chain-terminal-modified SBR which contains the functional group at a main chain and whose at least one terminal has been modified with the modifier); or a terminal-modified SBR which has been modified (coupling) with a multifunctional compound having two or more epoxy groups in a molecule and into which a hydroxyl group or an epoxy group has been introduced. These may be used alone or in combination of two or more.

Examples of the functional group include an amino group, an amide group, a silyl group, an alkoxysilyl group, an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. Among them, an amino group (preferably, an amino group obtained by substituting a hydrogen atom of an amino group with an alkyl group having 1 to 6 carbon atoms), an alkoxy group (preferably, an alkoxy group having 1 to 6 carbon atoms), an alkoxysilyl group (preferably, an alkoxysilyl group having 1 to 6 carbon atoms), and an amide group are preferable.

As the SBR, an SBR manufactured and sold by Sumitomo Chemical Co., Ltd., JSR Corporation, Asahi Kasei Corporation, or Zeon Corporation can be used.

The content of SBR in 100% by mass of the rubber component is preferably 20% by mass or more, more preferably 50% by mass or more, and is preferably 90% by mass or less, more preferably 80% by mass or less, and still more preferably 70% by mass or less. In addition, in particular, the content of SBR in 100% by mass of the rubber component is preferably 55% by mass or more.

BR is not particularly limited, and those commonly used in the tire industry can be used. These may be used alone or in combination of two or more.

The sys amount of BR is preferably 90% by mass or more, more preferably 95% by mass or more, still more preferably 97% by mass or more. The upper limit is not particularly limited and may be even 100% by mass.

The BR may be unmodified BR or modified BR. The modified BR may be a modified BR into which the above-mentioned functional group is introduced. A preferable mode is the same as that of the modified SBR.

As the BR, for example, a product of Ube Industries, Ltd., JSR Corporation, Asahi Kasei Corporation, or Zeon Corporation can be used.

The content of BR in 100% by mass of the rubber component is preferably 10% by mass or more, more preferably 15% by mass or more, and is preferably 80% by mass or less, preferably 50% by mass or less, and more preferably 35% by mass or less.

Examples of the isoprene-based rubber include natural rubber (NR), epoxidized natural rubber (ENR), isoprene rubber (IR), reformed NR, modified NR, and modified IR. As the NR, for example, those commonly used in the tire industry such as SIR20, RSS #3, TSR20 and the like can be used. The IR is not particularly limited, and, for example, those commonly used in the tire industry such as IR 2200 can be used. Examples of the reformed NR include deproteinized natural rubber (DPNR) and high-purity natural rubber (UPNR). Examples of the modified NR include epoxidized natural rubber (ENR), hydrogenated natural rubber (HNR), and grafted natural rubber. Examples of the modified IR include epoxidized isoprene rubber, hydrogenated isoprene rubber, and grafted isoprene rubber. These may be used alone or in combination of two or more. The NR is particularly preferable.

The content of isoprene-based rubber in 100% by mass of the rubber component is preferably 5% by mass or more, more preferably 10% by mass or more, and is preferably 40% by mass or less, and more preferably 30% by mass or less.

It is preferable that the tread rubber 2A contains a filler. Specific examples of the filler include silica, carbon black, calcium carbonate, talc, alumina, clay, aluminum hydroxide, and mica. Among these, silica and carbon black can be preferably used as a reinforcing agent, and they are preferably used in combination. It is noted that when silica is used, it is preferably used in combination with a silane coupling agent.

When silica and carbon black are used in combination, the total content of them in 100% by mass of the rubber component is preferably 30% by mass or more, and 150% by mass or less.

In addition, the ratio of the content of carbon black to the content of silica is preferably 50% by mass or less, preferably 25% by mass or less, and more preferably 10% by mass or less. Black carbon is higher in reinforcing ability than silica. Accordingly, when the ratio exceeds 50% by mass, a complex elastic modulus of the tread rubber 2A becomes excessively high, and there is a tendency that the low noise property during high-speed travelling becomes worse. It is noted that the ratio of the content of carbon black to the content of silica is preferably 2% by mass or more, and more preferably 4% by mass or more.

The rubber composition of the tread rubber 2A preferably includes silica. Examples of the silica include dry process silica (anhydrous silicic acid), wet process silica (hydrous silicic acid) and the like, but wet process silica is preferred because of the large number of silanol groups. It is noted that the rubber composition may contain silica of a type other than the above-mentioned types. These may be used alone or in combination of two or more.

The content of silica is preferably 10 parts by mass or more, more preferably 40 parts by mass or more, still more preferably 50 parts by mass or more, still more preferably 60 parts by mass or more, particularly preferably 70 parts by mass or more, more particularly preferably 80 parts by mass or more, and most preferably 90 parts by mass or more, and is preferably 120 parts by mass or less, more preferably 115 parts by mass or less, still more preferably 110 parts by mass or less, particularly preferably 105 parts by mass or less, and most preferably 100 parts by mass or less with respect to 100 parts by mass of the rubber component.

The silica may be a commercial product of, for example, Degussa, Rhodia, Tosoh Silica Corporation, Evonik Japan, Solvay Japan, or Tokuyama Corporation.

The rubber composition of the tread rubber 2A preferably includes a silane coupling agent as well as silica. The silane coupling agent is not particularly limited, and examples of the silane coupling agent include: a sulfide-based silane coupling agent such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; a mercapto-based silane coupling agent such as 3-mercaptopropyltrimethoxysilane, 2-mercaptoethyltriethoxysilane, and NXT and NXT-Z both available from Momentive; a vinyl-based silane coupling agent such as vinyltriethoxysilane and vinyltrimethoxysilane; an amino-based silane coupling agent such as 3-aminopropyltriethoxysilane and 3-aminopropyltrimethoxysilane; a glycidoxy-based silane coupling agent such as γ-glycidoxypropyltriethoxysilane and γ-glycidoxypropyltrimethoxysilane; a nitro-based silane coupling agent such as 3-nitropropyltrimethoxysilane and 3-nitropropyltriethoxysilane; and a chloro-based silane coupling agent such as 3-chloropropyltrimethoxysilane and 3-chloropropyltriethoxysilane. These may be used alone or in combination of two or more.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The content of silane coupling agent in 100% by mass of silica is, for example, more than 3% by mass and less than 25% by mass.

The carbon black contained in the rubber composition of the tread rubber 2A is not particularly limited, and examples thereof include N134, N110, N220, N234, N219, N339, N330, N326, N351, N550, and N762. These may be used alone or in combination of two or more.

The carbon black may be a commercial product of, for example, Asahi Carbon Co., Ltd., Cabot Japan K.K., Tokai Carbon Co., Ltd., Mitsubishi Chemical Corporation, Lion Corporation, Nippon Steel Chemical Carbon Co., Ltd., or Columbia Carbon.

The content of the carbon black is preferably 1 part by mass or more, more preferably 3 parts by mass or more, and is preferably 50 parts by mass or less, more preferably 30 parts by mass or less, and still more preferably 10 parts by mass or less.

The rubber composition of the tread rubber 2A preferably includes a plasticizer (softening agent). Examples of the plasticizer include a resin component, oil, a liquid rubber, and an ester plasticizer. These may be used alone or in combination of two or more. In particular, the plasticizer is preferably oil or a resin component.

The oil may be any oil that has been generally used in the tire industries, and examples thereof include process oils, vegetable oils, and mixtures thereof. Examples of the process oil include paraffinic process oil, aromatic process oil, and naphthenic process oil. Examples of the vegetable oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combination of two or more. In particular, the process oil is preferable, and the aromatic process oil is more preferable.

The oil may be a commercial product of Idemitsu Kosan Co., Ltd., Sankyo Yuka Kogyo K.K., ENEOS Corporation, Olisoy, H&R, Hokoku Corporation, Showa Shell Sekiyu K.K., and Fuji Kosan Co., Ltd.

The liquid rubber mentioned above as the softening agent is a polymer that is in a liquid condition at normal temperature (25° C.), and comprises a monomer similar to a solid rubber as a constituent element. Examples of the liquid rubber include a farnesene-based polymer, a diene-based liquid polymer, and their hydrogenated products.

The farnesene-based polymer is a polymer obtained by polymerizing farnesene and has units based on farnesene. Farnesene has isomers such as α-farnesene((3E,7E)-3,7,11-trimethyl-1,3,6,10-dodecatetraene), or β-farnesene(7,11-dimethyl-3-methylene-1,6,10-dodecatriene).

The farnesene-based polymer may be a monopolymer of farnesene (farnesene monopolymer) or a copolymer of farnesene and a vinyl monomer (farnesene-vinyl monomer copolymer).

Examples of the diene-based liquid polymer include a liquid styrene-butadiene copolymer (liquid SBR), a liquid butadiene copolymer (liquid BR), a liquid isoprene copolymer (liquid IR), and a liquid styrene isoprene copolymer (liquid SIR).

The diene-based liquid polymer has, for example, more than $1.0 \times 10^3$ and less than $2.0 \times 10^5$ weight average molecular weight (Mw) expressed in terms of polystyrene measured by gel permeation chromatography (GPC). It is noted that in the present specification, the Mw of the diene-based liquid polymer is a value expressed in terms of polystyrene measured by the gel permeation chromatography (GPC).

The content of the liquid rubber (the total content of the farnesene-based liquid polymer, the diene-based liquid polymer, etc.) is, for example, more than 1 part by mass and less than 100 parts by mass with respect to 100 parts by mass of the rubber component.

The liquid rubber may be a commercial product of, for example, Kuraray Co., Ltd. or Cray Valley.

In addition, the rubber composition of the tread rubber 2A preferably includes a resin component as necessary. The resin component can be solid or liquid at normal temperature, and specific examples of resin components include styrene resins, coumarone resins, terpene resins, C5 petroleum resins, C9 petroleum resins, C5C9 petroleum resins, and acrylic resins. These may be used alone or in combination of two or more. The content of the resin component in 100% by mass of the rubber component is preferably more than 2% by mass and less than 45% by mass, and more preferably less than 30% by mass.

The styrene resin is a polymer that comprises a styrene monomer as a constituent monomer, and an example thereof is a polymer that is obtained by polymerizing the styrene monomer as a main component (50% by mass or more). Specific examples thereof include: monopolymers that are respectively obtained by polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.) individually; a copolymer that is obtained by copolymerizing two or more types of styrene monomers; a styrene monomer; and a copolymer of another monomer that can be copolymerized with the styrene monomer.

Example of the other monomer include: acrylonitriles such as acrylonitrile and methacrylonitrile; acrylics; unsaturated carboxylic acids such as methacrylic acid; unsaturated carboxylic acid esters such as methyl acrylate and methyl methacrylate; dienes such as chloroprene and butadiene-isoprene; olefins such as 1-buten and 1-pentene; and α,β-unsaturated carboxylic acid such as maleic anhydride or acid anhydride thereof.

As the coumarone resin, coumarone indene resin is preferably used. The coumarone indene resin is a resin that contains coumarone and indene as monomer components constituting the skeleton of the resin (main chain). Examples of the monomer components, other than coumarone and indene, that may be contained in the skeleton include styrene, a-methylstyrene, methylindene, and vinyl toluene.

The content of the coumarone indene resin is, for example, more than 1.0 parts by mass and less than 50.0 parts by mass with respect to 100 parts by mass of the rubber component.

The hydroxy value (OH value) of the coumarone indene resin is, for example, more than 15 mgKOH/g and less than 150 mgKOH/g. It is noted that the OH value indicates an amount of potassium hydroxide, given in milligrams, that is required to neutralize acetic acid combined with a hydroxyl group, when one gram of resin is acetylated, and is measured by potentiometric titration (JIS K 0070:1992).

The softening point of the coumarone indene resin is, for example, higher than 30° C. and lower than 160° C. It is noted that the softening point is a softening point that is measured with a ring and ball softening point measuring device according to JIS K6220-1: 2001 and is a temperature at which a ball has descended.

Examples of the terpene resin include polyterpene, terpene phenol, and aromatic modified terpene resin. Polyterpenes are resins obtained by polymerizing terpene compounds and their hydrogenated products. The terpene compound is a compound that comprises, as a basic skeleton, terpen that is a hydrocarbon represented by a composition of $(C_5H_8)_n$ and an oxygen-containing derivative thereof and is classified into monoterpene ($C_{10}H_{16}$), sesquiterpene ($C_{15}H_{24}$), diterpene ($C_{20}H_{32}$), etc., and examples there of include α-pinene, β-pinene, dipentene, limonene, myrcene, alloocimene, ocimene, α-ferrandrene, α-terpinene, γ-terpinene, terpinolene. 1,8-cineole, 1,4-cineole, α-terpineol, β-terpineol, and γ-terpineol.

Examples of polyterpenes include terpene resins such as α-pinene resins, β-pinene resins, limonene resins, dipentene resins, β-pinene/limonene resins, etc. that are made from the above-mentioned terpene compounds, as well as hydrogenated terpene resins that are obtained by hydrogenating the terpene resins. Examples of the terpene phenol include a resin obtained by copolymerizing the terpene compound and the phenol compound, and a resin obtained by hydrogenating the resin. Specific examples thereof include a resin obtained by condensing the terpene compound, the phenol compound, and formalin. Examples of phenolic compounds include phenol, bisphenol A, cresol, and xylenol. Examples of the aromatic modified terpene resin include a resin obtained by modifying a terpene resin with an aromatic compound, and a resin obtained by hydrogenating the resin. The aromatic compound is not particularly limited as long as it has an aromatic ring. Examples thereof include: phenol compounds such as phenol, alkylphenol, alkoxyphenol, unsaturated hydrocarbon group-containing phenol; naphthol compounds such as naphthol, alkylnaphthol, alkoxynaphthol, unsaturated hydrocarbon group-containing naphthol; styrene derivatives such as styrene, alkylstyrene, alkoxystyrene, and unsaturated hydrocarbon group-containing styrene; coumarone; and indene.

The "C5 petroleum resin" refers to a resin obtained by polymerizing a C5 fraction. Examples of the C5 fraction include petroleum fractions corresponding to carbon numbers 4-5 such as cyclopentadiene, pentene, pentadiene, and isoprene. As the C5 petroleum resin, dicyclopentadiene resin (DCPD resin) is suitably used.

The "C9 petroleum resin" refers to a resin obtained by polymerizing a C9 fraction, and to one obtained by hydrogenating or modifying the resin. Examples of the C9 fraction include petroleum fractions corresponding to carbon numbers 8-10 such as vinyl toluene, alkylstyrene, indene, and methylindene. As specific examples, coumarone indene resin, coumarone resin, indene resin, and aromatic vinyl resin are suitably used. The aromatic vinyl resin is preferably a monopolymer of α-methylstyrene or styrene or a copolymer of α-methylstyrene and styrene, and is more preferably a copolymer of α-methylstyrene and styrene because of being economical, easy to process, and excellent on heat generation. The aromatic vinyl resin may be a commercial product of, for example, Kraton Corporation or Eastman Chemical Company.

The "C5C9 petroleum resin" refers to a resin obtained by copolymerizing the C5 fraction and the C9 fraction, and to one obtained by hydrogenating or modifying the resin. Examples of the C5 fraction and the C9 fraction include the above-mentioned petroleum fractions. The C5C9 petroleum resin may be a commercial product of, for example, Tosoh Corporation or Luhua.

The acrylic resin is not particularly limited, but, for example, a solvent-free acrylic resin may be used.

Examples of the solvent-free acrylic resin include (meth) acrylic resin (polymer) synthesized by a high temperature continuous polymerization method (high temperature continuous mass polymerization method) (the method described in U.S. Pat. No. 4,414,370, Japanese Kokai Publication Sho-59-6207, Japanese Kokoku Publication Hei-05-58005, Japanese Kokal Publication Hol-01-313522, U.S. Pat. No. 5,010,166, Toa Gosei Research Annual Report TREND2000 No. 3 p42-45, etc.) without using as much as possible a polymerization initiator, a chain transfer agent, an organic solvent and the like as auxiliary materials. In the present disclosure, (meth) acryl means methacryl and acryl.

Examples of the monomer component constituting the acrylic resin include (meth) acrylic acid, (meth) acrylic acid esters (alkyl esters, aryl esters, aralkyl esters, etc.), (meth) acrylamides, and (meth) acrylic acid derivatives such as (meth) acrylamide derivatives.

In addition, as a monomer component constituting the acrylic resin, aromatic vinyl such as styrene, a-methylstyrene, vinyl toluene, vinyl naphthalene, divinyl benzene, trivinyl benzene, or divinyl naphthalene may be used, as well as (meth) acrylic acid or (meth) acrylic acid derivative.

The acrylic resin may be a resin composed only of a (meth) acrylic component, or may be a resin including components other than the (meth) acrylic component. In addition, the acrylic resin may contain a hydroxyl group, a carboxyl group, a silanol group, or the like.

The resin component may be a commercial product of, for example, Maruzen Petrochemical Co., Ltd., Sumitomo Bakelite Co., Ltd., Yashara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries Co., Ltd., or Taoka Chemical Co., Ltd.

The resin component may be a commercial product of, for example, Maruzen Petrochemical Co., Ltd., Sumitomo Bakelite Co., Ltd., Yashara Chemical Co., Ltd., Tosoh Corporation, Rutgers Chemicals, BASF, Arizona Chemical, Nitto Chemical Co., Ltd., Nippon Shokubai Co., Ltd., ENEOS Corporation, Arakawa Chemical Industries Co., Ltd., or Taoka Chemical Co., Ltd.

The wax contained in the rubber composition of the tread rubber 2A may be any wax that has been generally used in the tire industries, and examples thereof include: petroleum wax such as paraffin wax and microcrystalline wax; natural wax such as botanical wax and animal wax; and synthetic wax such as a polymer of ethylene, propylene or the like. These may be used alone or in combination of two or more. In particular, the petroleum wax is preferable, and the paraffin wax is more preferable.

The wax may be a commercial product of, for example, Ouchi Shinko Chemical Industrial Co., Ltd., Nippon Seiro Co., Ltd., or Seiko Chemical Co., Ltd.

The anti-aging agent contained in the rubber composition of the tread rubber 2A may be any anti-aging agent that has been generally used in the tire industries, and examples thereof include: naphthylamine anti-aging agents such as phenyl-α-naphthylamine; diphenylamine anti-aging agents such as octylated diphenylamine and 4,4'-bis(α, α'-dimethylbenzyl)diphenylamine; p-phenylenediamine anti-aging agents such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline anti-aging agents such as 2,2,4-trimethyl-1,2-dihydroquinoline polymer; monophenolic anti-aging agents such as 2,6-di-t-butyl-4-methylphenol and styrenated phenol; and bis-, tris-, or polyphenolic anti-aging agents such as tetrakis-[methylene-3-(3',5'-di-t-butyl-4'-hydroxyphenyl)-propionate]methane. These may be used alone or in combination of two or more. In particular, the p-phenylenediamine anti-aging agents and the quinoline anti-aging agents are preferable.

The anti-aging agent may be a commercial product of, for example, Seiko Chemical Co., Ltd., Sumitomo Chemical Co., Ltd., Ouchi Shinko Chemical Industrial Co., Ltd., or Flexsys.

The zinc oxide contained in the rubber composition of the tread rubber 2A may be a conventionally known one, and examples thereof include commercial products of companies: Mitsui Mining & Smelting, Toho Zinc, HakusuiTech, Seido Chemical Industry, and Sakai Chemical Industry.

The stearic acid contained in the rubber composition of the tread rubber 2A may be a conventionally known one, and examples thereof include commercial products of companies: NOF Corporation, Kao Corporation, FUJIFILM Wako Pure Chemical Corporation, and Chiba Fatty Acid Co., Ltd.

The sulfur contained in the rubber composition of the tread rubber 2A may be any sulfur that has been generally used in the tire industries, and examples thereof include: powdered sulfur, precipitated sulfur, colloidal sulfur, insoluble sulfur, highly dispersible sulfur, and soluble sulfur. These may be used alone or in combination of two or more.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The vulcanization accelerator contained in the rubber composition of the tread rubber 2A may be any vulcanization accelerator that has been generally used in the tire industries, and examples thereof include: thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone or in combination of two or more. In particular, the sulfenamide vulcanization accelerators and the thiuram vulcanization accelerators are preferable, and it is preferable that sulfenamide vulcanization accelerator(s) and thiuram vulcanization accelerator(s) are used in combination.

The vulcanization accelerator may be a commercial product of, for example, Kawaguchi Chemical Industry Co., Ltd., Ouchi Shinko Chemical Industrial Co., Ltd., or Rhein Chemie.

A tread pattern is formed on the tread surface 21 so that each of tire performances such as grip performance, braking performance, drainage function, and wear suppression is exhibited. The tread pattern is formed of a plurality of recessed grooves formed on the tread surface 21. On the tread surface 21, a plurality of main grooves 22 (an example of peripheral-direction grooves of the present disclosure) continuously extending in the peripheral direction D3 (see FIG. 1) of the tire 1 are formed as the recessed grooves. It is noted that, for example, a plurality of lug grooves (not shown) crossing the main grooves 22 or a plurality of sipes that are narrower in width and shallower in depth than the main grooves 22 and the lug grooves may be formed on the tread surface 21. It is noted that the recessed grooves mentioned here refer to those having more than 2.0 mm of groove width and more than 5.0 mm of groove depth.

The tread pattern formed on the tread surface 21 may be what is called a rib type pattern having a plurality of main grooves 22, or what is called a rib-lug type pattern having the main grooves 22 and the lug grooves. However, the tread portion 2 of the tire 1 is not limited to one in which any one of these patterns is formed on the tread surface 21. For example, in the tread portion 2, what is called a lug type pattern mainly having the lug grooves, or what is called a block type pattern having independent blocks, may be formed on the tread surface 21. In addition, the tread pattern may be asymmetrical to the width direction of the ground contact surface.

In the present embodiment, the tread pattern formed on the tread surface 21 is symmetrical to the width direction D1 with respect to the equator plane CL1. Specifically, as shown in FIG. 2, four main grooves 22 are formed on the tread surface 21 along the peripheral direction D3. The four main grooves 22 are disposed at predetermined intervals in the width direction D1 of the tire 1 such that two main grooves 22 are disposed in each region of the tread surface 21 outside the equator plane CL1 in the width direction D1. Accordingly, the tread portion 2 includes five land portions 24 divided in the width direction D1 by the four main grooves 22 extending along the peripheral direction D3. It is noted that although the present embodiment describes, as one example, a configuration where, as shown in FIG. 2, four main grooves 22 are formed on the tread surface 21, the present disclosure is not limited to the configuration. For example, the main grooves 22 may be located asymmetrically to the width direction D1. In addition, the number of the main grooves 22 is not limited to four, but may be less than four or five or more. In addition, one of the main grooves 22 may be positioned on the equator plane CL1.

As shown in FIG. 2, the five land portions 24 include one crown land portion 24A, two middle land portions 24B, and two shoulder land portions 24C. The shoulder land portions 24C are disposed in the vicinity of the shoulder portions 3, and are sectioned between the opposite ends of the tread portion 2 in the width direction D1 and two second main grooves 22B disposed at most outside in the width direction D1. The middle land portions 24B are sectioned between two first main grooves 22A (an example of the peripheral-direction grooves of the present disclosure) disposed in the vicinity of the equator plane CL1 and the two second main grooves 22B. In addition, the crown land portion 24A is disposed at a part of the tread portion 2 of the tire 1 that crosses the equator plane CL1, and is sectioned between the two first main grooves 22A. That is, the crown land portion 24A is sectioned to be sandwiched between the two first main grooves 22A.

The crown land portion 24A may extend straight or in a zigzag shape along the peripheral direction D3. In addition, the crown land portion 24A may, in the peripheral direction D3, obliquely extend, extend in a curved shape, or extend in an arc shape. For the crown land portion 24A to be in the above-described shape, the two first main grooves 22A located on both sides of the crown land portion 24A in the width direction D1 are each formed to extend straight, extend in a zigzag shape, obliquely extend, extend in a curved shape, or extend in an arc shape along the peripheral direction D3. In addition, the crown land portion 24A may have a plurality of blocks divided in the peripheral direction D3 by lateral grooves, such as the lug grooves, or inclined grooves, or a plurality of semi blocks divided in the peripheral direction D3 by lateral grooves or inclined grooves such as the sipes. It is noted that the land portions 24 other than the crown land portion 24A also extend along the peripheral direction D3, and are formed in the same shape as the crown land portion 24A.

It is noted that in a case where the tire 1 is for a passenger car, the groove width of the first main grooves 22A is, for example, 4.0% to 7.0% of the width of the tread portion 2. In addition, the groove width of the second main grooves 22B is, for example, 2.5% to 4.5% of the width of the tread portion 2. In addition, the groove depth of the first main grooves 22A and the second main grooves 22B is, for example, 5 mm to 10 mm.

The shoulder portions 3 correspond to corner parts of the tire 1 between the tread portion 2 and the side wall portions 4. The shoulder portions 3 are parts that connect the tread portion 2 to the side wall portions 4, and are formed in a round shape (curved shape) extending from opposite end parts of the tread portion 2 in the width direction D1 to upper end parts of the side wall portions 4.

The side wall portions 4 are composed of a vulcanized rubber composition (vulcanized rubber). The side wall portions 4 are disposed outside the carcass 6 in the width direction D1. The side wall portions 4 connect to opposite end parts, in the width direction D1, of the tread rubber 2A constituting the tread portion 2, and extend along the carcass 6 in the center direction D21. The side wall portions 4 protect the carcass 6 at the sides of the tire 1.

The carcass 6 is disposed inside the tread portion 2 and the pair of side wall portions 4, and disposed more on the side of the tread portion 2 and the pair of side wall portions 4 than the inner liner 7. The carcass 6 is composed of at least one carcass ply 6A. The carcass ply 6A is a cord layer including a large number of carcass cords (not shown) that extend in a direction crossing the equator plane CL1 of the tire 1. The carcass ply 6A is obtained by covering these carcass cords with topping rubber made of a predetermined rubber composition (vulcanized rubber). The large number of carcass cords are arranged to align along the peripheral direction D3 of the tire 1 in a state of crossing the equator plane CL1 of the tire 1 at a predetermined angle (for example, an angle in the range of 70 to 90 degrees). As the carcass cords, for example, cords composed of organic fibers such as nylon fibers, polyester fibers, rayon fibers, or aramid fibers (hereinafter referred to as "organic fiber cords") are used.

The inner liner 7 is disposed more inside than the carcass 6 to form the inner surface 7A of the tire 1. The inner liner 7 is made of a rubber composition (vulcanized rubber) having air shutoff property, and has a role of holding the internal pressure of the tire 1.

The bead portions 5 are parts that are coupled with the wheel and fix the tire 1 to the rim 30R by the internal pressure. Each of the bead portions 5 includes a bead core 5A and an apex rubber 5B, wherein the bead core 5A is composed of a plurality of bead wires 5C made of steel. The apex rubber 5B is located outside the bead core 5A in the radial direction D2 and is, for example, made of a rubber composition (vulcanized rubber) having high rigidity. The external side of the bead core 5A and the apex rubber 5B is surrounded by the carcass ply of the carcass 6.

Specifically, the carcass ply 6A is folded from inside to outside in the width direction D1 around the bead core 5A, and extends along the outside of the bead portions 5 in the width direction D1 towards the outside in the radial direction D2. The bead core 5A and the apex rubber 5B are disposed in a part that is surrounded in this way by the carcass ply 6A.

The belt portion 8 is a belt-like member extending in the peripheral direction D3 of the tire 1. The belt portion 8 is disposed inside the tread portion 2 in the radial direction D2 and outside the carcass 6. The belt portion 8 has a role of enhancing the synthesis of the tread portion 2 by tightening the carcass 6 in the radial direction D2. The belt portion 8 is also a reinforcing layer for reinforcing the carcass 6 together with the band portion 9 described below.

The belt portion 8 is composed of at least one belt ply 8A. In the present embodiment, the belt portion 8 includes two belt plies 8A. The belt portion 8 extends to make one round of the tire 1 in the peripheral direction D3. Each of the belt plies 8A includes a large number of belt cords (not shown) that extend in a direction crossing the equator plane CL1 of the tire 1. Each of the belt plies 8A is obtained by covering these belt cords with topping rubber. The large number of belt cords are arranged to align along the peripheral direction D3 of the tire 1 in a state of crossing the equator plane CL1 of the tire 1 at a predetermined angle (for example, an angle in the range of 10 to 35 degrees). In the belt portion 8, each of the belt plies 8A is disposed such that the belt cords are oriented to cross each other. As the belt cords, cords made of steel (steel cords) or the organic fiber cords are used.

The band portion 9 is a belt-like member extending in the peripheral direction D3 of the tire 1. The band portion 9 is disposed inside the tread portion 2 in the radial direction D2 and outside the belt portion 8. The band portion 9 includes a full band 9A and a pair of edge bands 9B, wherein the full band 9A covers the entire belt portion 8, and the pair of edge bands 9B are disposed at positions corresponding to the opposite end parts of the tread portion 2 in the width direction D1. The band portion 9 has a role of restricting the movement of the belt portion 8 to prevent the belt portion 8 from floating up or peeling off by the centrifugal force generated during travelling of the vehicle. In addition, the band portion 9 is also a reinforcing layer for reinforcing the carcass 6 together with the belt portion 8 described above.

Figure 3A:
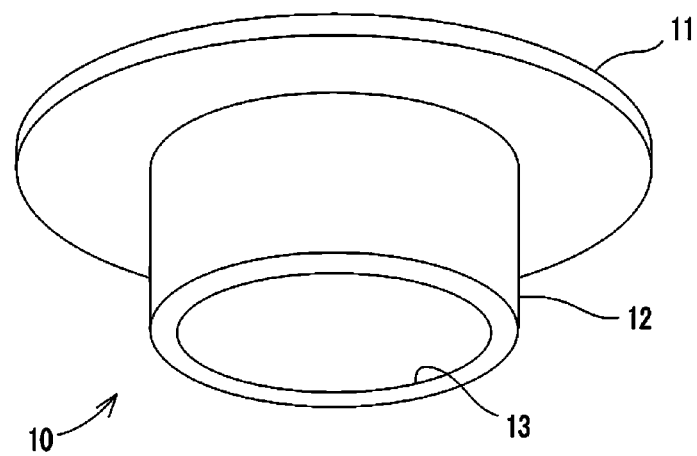
FIG. 3A is a schematic diagram showing an example of a mount member attached to the tire.
Figure 3B:
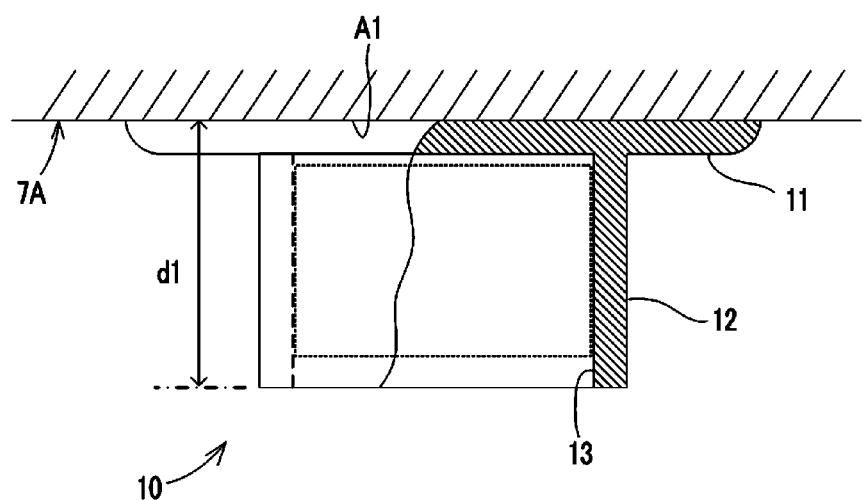
FIG. 3B is a schematic diagram showing another example of the mount member attached to the tire.

FIG. 3A and FIG. 3B are diagrams showing a configuration of the mount member 10. FIG. 3A is a perspective diagram of the mount member 10. FIG. 3B is a partial cross-sectional diagram of the mount member 10.

The mount member 10 is a member to which electric equipment such as a sensor for detecting temperature, vibration, pressure, acceleration or the like is attached. The mount member 10 is fixed to the inner surface 7A of the tire 1. Examples of the electric equipment other than the sensor include a relay for relaying a wireless communication or the like, and a transmitter for transmitting a predetermined signal.

As shown in FIG. 3A and FIG. 3B, the mount member 10 includes a mounting seat portion 11 and a main body portion 12, wherein the mounting seat portion 11 is fixed to the inner surface 7A, and the electric equipment is attached to the main body portion 12 in a detachable manner. The mount member 10 is obtained by integrally forming the mounting seat portion 11 and the main body portion 12 from a vulcanized rubber composition (vulcanized rubber). It is noted that a part indicated by a dotted line in FIG. 3B represents the electric equipment attached to the mount member 10.

The mount member 10 is composed of a rubber composition different from that of the tread rubber 2A. However, with regard to materials blended into the rubber composition, the same materials as those of the rubber composition of the tread rubber 2A can be used. That is, the rubber composition (first rubber composition) constituting the mount member 10 includes, in addition to the above-mentioned rubber components, a reinforcing agent such as silica or carbon black, and an additive such as oil, a resin component, wax, an anti-aging agent, zinc oxide, stearic acid, sulfur, or a vulcanization accelerator. Of course, in the rubber component, one of the above-mentioned rubber materials may be used alone, or two or more of the rubber materials may be used in combination, blended at a predetermined blend ratio.

The mounting seat portion 11 is formed, for example, in a disk shape, and is formed such that its outer diameter is larger than the outer diameter of the main body portion 12. In addition, the main body portion 12 is formed in a shape of a cylinder projecting from one of disk surfaces of the mounting seat portion 11. An opening 13 is formed in a projection end surface of the main body portion 12, and the electric equipment is fitted into the main body portion 12 through the opening 13 to be held therein by the elasticity of the rubber. As the method for mounting the mounting seat portion 11 to the inner surface 7A of the tire 1, various methods can be adopted.

For example, in a possible mounting method, a skin of the mounting area A1 (mounting surface) of the inner surface 7A is removed by applying a predetermined surface processing treatment to the mounting area A1, and in that state, the mounting seat portion 11 of the mount member 10 is fixed to the mounting area A1 by being welded or adhered with an adhesive. Examples of the surface processing treatment include: a treatment of removing the mold releasing agent together with the skin by polishing the surface of the mounting area A1 of the inner surface 7A with a polishing machine; and a treatment of removing the mold releasing agent together with the skin of the surface of the mounting area A1 by irradiating a laser beam onto the surface of the mounting area A1.

In more detail, the surface processing treatment is a treatment to process and make the surface of the mounting area A1 an even surface (for example, a flat surface) by polishing with a polishing machine or irradiation of the laser beam. This improves the adhesion between the mounting area A1 and the contact surface of the mounting seat portion 11, and enhances the mounting strength of the mount member 10 at the mounting area A1. In addition, since it also removes the mold releasing agent adhered to the mounting area A1, a strength reduction due to the mold releasing agent is prevented. As a result, the mount member 10 is more stiffly mounted to the mounting area A1.

It is noted that, before the mount member 10 is mounted, the surface processing treatment of polishing with a polishing machine or irradiation of the laser beam is preferable to be applied to an adhesion surface of the mounting seat portion 11, too. This further improves the adhesion between the adhesion surface of the mounting seat portion 11 and the mounting area A1, and further enhances the mounting strength of the mount member 10.

In addition, other examples of the method for mounting the mounting seat portion 11 include: a mounting method to vulcanize the tire 1 without applying the mold releasing agent to the mounting area A1, and then fix the mounting seat portion 11 to the mounting area A1 by welding or adhering with an adhesive; and a mounting method to join the mounting seat portion 11 to the inner surface 7A of the tire 1 before vulcanization, and then fixes the mount member 10 to the inner surface 7A by vulcanizing the tire 1 together with the mount member 10.

Here, if the fixation of the mount member 10 is not sufficient, the mounting seat portion 11 of the mount member 10 may partially peel off while the vehicle is travelling and the peeled-off part may come in contact with the inner surface 7A along with rolling of the tire 1, causing the contact sound to be sensed as an unpleasant noise. For this reason, as the surface processing treatment, a processing treatment with laser beam irradiation is preferable since it can uniformly process the surface of the mounting area A1 or the contact surface of the mounting seat portion 11 with high precision. In addition, according to the processing treatment with laser beam irradiation, a step at a boundary between a part where the treatment has been performed (surface-processed surface) and a part where the treatment has not been performed (untreated surface) can be 200 μm or less, causing a less amount of skin to be scraped than a processing treatment with polishing. It is noted that it is possible to determine whether or not the surface processing treatment with laser beam irradiation has been performed by confirming whether or not the step at the boundary between a part where the surface processing treatment has been performed (surface-processed surface) and a part where the surface processing treatment has not been performed (untreated surface) is 200 μm or less. That is, when the step at the boundary is 200 μm or less, it is determined that the surface processing treatment with laser beam irradiation has been performed; and when the step at the boundary is more than 200 μm, it is determined that another surface processing treatment has been performed.

In the present embodiment, as shown in FIG. 2, the mount member 10 is disposed on the inner surface 7A of the tire 1 at a position corresponding to the crown land portion 24A described above. Specifically, the mount member 10 is disposed on the inner surface 7A of the tire 1 at the mounting area A1 (mounting position) corresponding to the above-described crown land portion 24A.

The mounting area A1 is an area in the inner surface 7A that is divided by two straight lines L1 that respectively pass through opposite ends of a ground contact surface of the crown land portion 24A in the width direction D1, and are perpendicular to a tread surface profile that is obtained by imaginarily connecting the surface of the crown land portion 24A. In other words, the mounting area A1 is an area in a rear surface (a surface on the inner side) of the tread portion 2, the area being surrounded by two crossing portions P1 where the two straight lines L1 that are parallel to the equator plane CL1 cross the inner surface 7A. It is noted that the straight lines L1 respectively pass through opposite ends of the crown land portion 24A in the width direction D1 and are parallel to the equator plane CL1. Here, the position corresponding to the crown land portion 24A means a position that is disposed such that the center of the mounting seat portion 11 of the mount member 10 is located in the mounting area A1, and is not limited to a position where a straight line (a straight line included in the equator plane CL1) passing through the center of the crown land portion 24A coincides with the center of the mount member 10.

It is noted that the mounting area A1 may correspond to both or either of the two middle land portions 24B. In this case, the mounting area A1 is an area in the inner surface 7A that is divided by two straight lines L2 that pass through the opposite ends of the ground contact surface of the middle land portion 24B in the width direction D1, and are perpendicular to a tread surface profile that is obtained by imaginarily connecting the surface of the middle land portion 24B. In addition, the mounting area A1 may correspond to both or either of the two shoulder land portions 24C. In this case, the mounting area A1 is an area in the inner surface 7A that is divided by a straight line L31 and a straight line L32, wherein the straight line L31 passes through an end of the ground contact surface of the tread surface 21, and the straight line L32 passes through an end of the shoulder land portion 24C on the side of the second main groove 22B and is perpendicular to the tread surface profile.

In the present embodiment, the mount member 10 is fixed to the inner surface 7A such that the center of the mounting seat portion 11 coincides with an intersection of: a straight line (a straight line included in the equator plane CL1) that passes through the center of the crown land portion 24A and the center of the tire 1 in the cross-sectional diagram of FIG. 2; and the inner surface 7A. In other words, the mount member 10 is not disposed at a position in the inner surface 7A that corresponds to the main grooves 22 formed on the tread portion 2. That is, the mount member 10 is not mounted at a position on the tread portion 2 that is in the rear of the main grooves 22.

In addition, the center of the mounting seat portion 11 is preferably within an area divided by straight lines that are perpendicular to the tread surface profile at positions of, with the equator plane CL1 as its center, 50% of the ground contact width of the ground contact surface of the tread portion 2. This is because it is considered that when the area is more outside than the positions of 50% in the width direction D1, a deformation amount of the tread portion 2 during rolling is large, and a vibration sound made by the mount member 10 becomes large.

Here, the tread surface profile is a surface shape that can be obtained by imaginarily connecting the surfaces of the land portions 24 in the normal state.

In addition, the ground contact width is the maximum position of the ground contact surface in the width direction that is obtained when the tire 1 is pressed against a flat road surface in a state of the normal inner pressure, normal load, and camper angle of 0 (zero) degrees.

It is noted that the normal load is a load specified by the standard on which the tire 1 is based. Specifically, the normal load is the "maximum load capacity" specified by the JATMA standard, the "maximum value" specified by the TRA standard in "Tire load limits at various cold inflation pressures", and the "load capacity" specified by the ETRTO standard.

Meanwhile, in a case where the mount member 10 attached with the electric equipment is installed on the inner surface 7A of the tire 1, the mount member 10 periodically abuts on the road surface via the tread portion 2 each time the tire 1 makes one round while the vehicle is travelling. In this case, a contact sound is made periodically. In addition, a periodical application of a load of the mount member 10 and the electric equipment to the road surface via the tread portion 2 causes a vibration of the tread portion 2, and the vibration causes a vibration sound. There is a concern that the periodical contact sound and vibration sound may be sensed as an unpleasant noise (noisy sound, noise, etc.) by a passenger of the vehicle.

On the other hand, in the present embodiment, as described above, the mount member 10 is fixed to the mounting area A1. With this configuration, when the tire 1 rotates while the vehicle is travelling, most of the force generated by the rotation of the tire 1 and the weight of the mount member 10 and the electronic component acts on the crown land portion 24A. It is considered that with this configuration, the unpleasant noise due to the load of the mount member 10 and the electronic component occurs only from the crown land portion 24A, and as a result, the noise due to the load is restricted.

If the mount member 10 is installed on the inner surface 7A at a position corresponding to the main groove 22, the load would act on each of the two land portions 24 located on both sides of the main groove 22. In this case, a noise due to the load is generated from each of the land portions 24, and the sound waves of each noise are synthesized and a higher beat sound may occur. On the other hand, in the tire 1 of the present embodiment, the mount member 10 is fixed to the mounting area A1, and thus such a noise does not occur.

To effectively restrict the noise, the mount member 10 is preferably installed within the above-described range of the mounting area A1. However, when the mounting seat portion 11 is a plate-like member formed in a disk shape, and the volume of the mounting seat portion 11 is small enough in comparison with the main body portion 12, the influence given by the mounting seat portion 11 to the noise is small. As a result, in this case, at least the main body portion 12 may be disposed in a range of the mounting area A1.

It is noted that although in the present embodiment, the mount member 10 including the mounting seat portion 11 is described, the mount member 10 may not include the mounting seat portion 11, but may be composed of only the main body portion 12. In this case, the central position of the mounting seat portion 11 is the center of a joint surface of the main body portion 12 and the inner surface 7A of the tire 1.

In addition, when a plurality of mount members 10 are mounted to the inner surface 7A of the tire 1, the mount members 10 are preferably arranged on the inner surface 7A at equal intervals along the peripheral direction D3. This makes it possible to keep the weight balance in the peripheral direction D3 equal when a plurality of mount members 10 are installed.

In addition, the mounting position of the mount member 10 is not limited to the mounting area A1. For example, the mount member 10 may be mounted to a position on the inner surface 7A of the tire 1 that corresponds to one of the two middle land portions 24B. In addition, the mount member 10 may be mounted to a position that corresponds to both of the two middle land portions 24B.

In addition, when two or more mount members 10 are mounted to the inner surface 7A in alignment in the width direction D1, they are preferably mounted to positions that correspond to both of the two middle land portions 24B that are disposed at equal intervals in the width direction D1 from the equator plane CL1 of the tire 1 in between. In this case, when the crown land portion 24A is present on the equator plane CL1, the mount members 10 may be mounted to positions corresponding to the crown land portion 24A. This makes it possible to keep the weight balance in the width direction D1 symmetrical to the equator plane CL1 and equal.

Figure 4A:
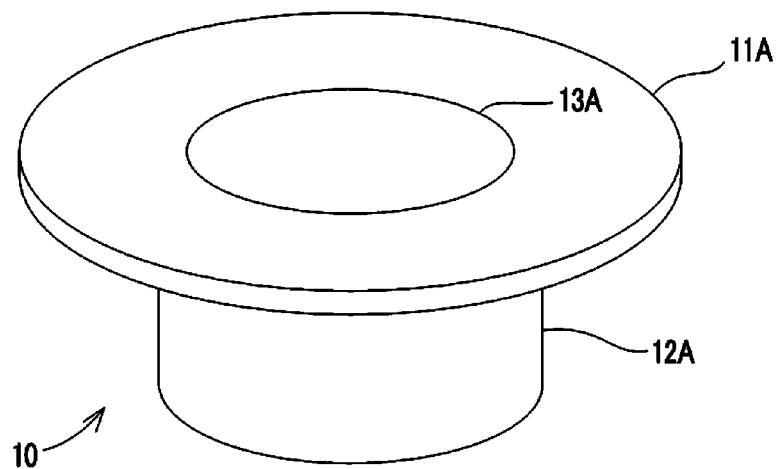
FIG. 4A is a schematic diagram showing another example of the mount member attached to the tire.
Figure 4B:
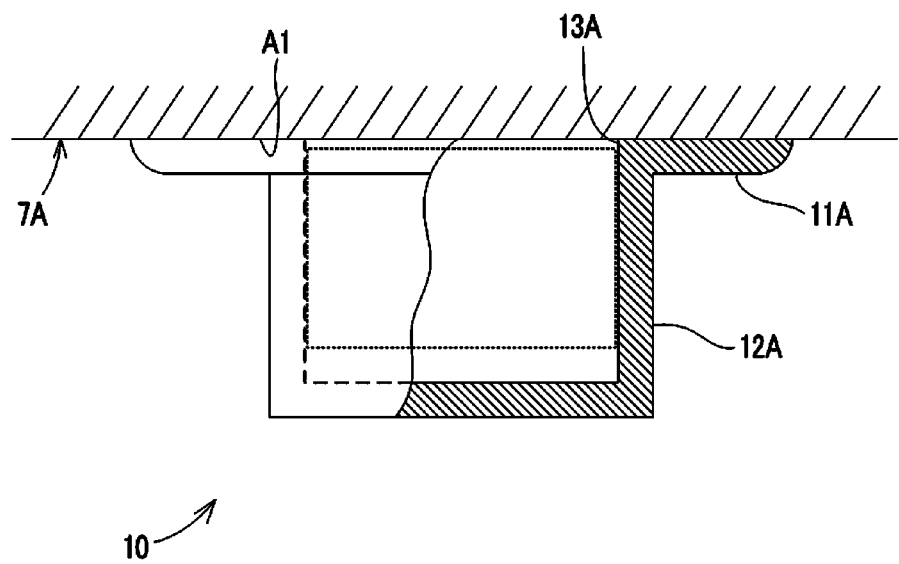
FIG. 4B is a schematic diagram showing another example of the mount member attached to the tire.

The mount member 10 may have any shape as far as it can be attached with the electric equipment, and, for example, may be formed as shown in FIG. 4A and FIG. 4B. Here, FIG. 4A and FIG. 4B are diagrams showing another configuration of the mount member 10. FIG. 4A is a perspective diagram of the mount member 10. FIG. 4B is a partial cross-sectional diagram of the mount member 10. The mount member 10 shown in FIG. 4A and FIG. 4B includes an annular and circular mounting seat portion 11A and a cylindrical main body portion 12A whose inner hole continues to an opening 13A of the mounting seat portion 11A. The other side of the main body portion 12A is closed. As a result, when the mounting seat portion 11A is fixed to the inner surface 7A in a state where the electric equipment is held in the main body portion 12A, the electric equipment is in a sealed state, shielded from outside.

In the present embodiment, thickness d1 (see FIG. 3B) that is the maximum thickness of the mount member 10 is preferably in a range of larger than 0.25 times and smaller than 1.25 times of thickness d2 (see FIG. 2) that is the thickness of the crown land portion 24A of the tread portion 2. That is, the thickness d1 in the mount member 10 and the thickness d2 in the tread portion 2 have a relationship represented by a formula (1) shown below. The thickness d1 is more preferably larger than 0.75 times of the thickness d2, still more preferably larger than 0.85 times of the thickness d2, and particularly preferably larger than 0.90 times of the thickness d2. In addition, the thickness d1 is more preferably smaller than 1.15 times of the thickness d2, still more preferably smaller than 1.10 times of the thickness d2, and particularly preferably smaller than 1.05 times of the thickness d2. Here, the thickness d1 of the mount member 10 is the shortest distance from the bottom surface of the mounting seat portion 11 to the top of the main body portion 12 of the mount member 10. In addition, the thickness d2 of the crown land portion 24A is the shortest distance from the tread surface of the tread rubber 2A to the band portion 9 at the center of the crown land portion 24A at the mounting position of the mount member 10.

$$0.25 \times d2 < d1 < 1.25 \times d2 \quad (1)$$

It is considered that when the thickness d1 of the mount member 10 is smaller than 0.25 times of the thickness d2 of the crown land portion 24A, the load applied from the mount member 10 and the electric equipment to the road surface during the rotation of the tire 1 is small, and thus the noise due to the load is small.

In addition, when the thickness d1 of the mount member 10 is larger than 1.25 times of the thickness d2 of the crown land portion 24A, the load applied from the mount member 10 and the electric equipment to the road surface is excessively large, and even if the mount member 10 is disposed in the mounting area A1, the noise due to the load cannot be restricted any more. It is considered from this that the noise that occurs from the tire 1 during travelling of the vehicle can be effectively restricted when the thickness d1 of the mount member 10 and the thickness d2 of the crown land portion 24A satisfy the relationship represented by the formula (1).

The thickness d1 of the mount member 10 is preferably 15 mm or less, more preferably 12 mm or less, and still more preferably 10 mm or less. It is considered that in a case where the thickness d1 is larger than 15 mm, when the land portion 24 corresponding to the mounting position of the mount member 10 comes in contact with the road surface, the movement of the tip of the mount member 10 becomes great, and a vibration easily occurs. In addition, the lower limit of the thickness d1 of the mount member 10 is not particularly limited, but it is preferably 1 mm or more, more preferably 3 mm or more, and still more preferably 6 mm or more.

In addition, the thickness d2 of the land portion 24 corresponding to the mounting position of the mount member 10 is preferably 5 mm or more, more preferably 6 mm or more, and still more preferably 7 mm or more. It is considered that in a case where the thickness d2 is smaller than 5 mm, a vibration is easily transmitted from the tread surface 21 to the mount member 10, and the effect of restricting the noise is reduced. On the other hand, the upper limit of the thickness d2 of the land portion 24 is not particularly limited, but it is preferably 12 mm or less, and more preferably 10 mm or less.

Complex elastic modulus $E^*1$ at 30° C. of the rubber composition constituting the mount member 10 is preferably larger than complex elastic modulus $E^*2$ at 30° C. of the rubber composition constituting the tread rubber 2A. That is, complex elastic modulus $E^*1$ of the mount member 10 and complex elastic modulus $E^*2$ of the tread rubber 2A have a relationship represented as $E^*1-E^*2>0$.

The complex elastic modulus $E^*$ of the rubber composition is known as a parameter serving as the index of the viscoelastic property of the rubber composition, and has correlation with the hardness of the rubber composition. When a rubber composition having a large complex elastic modulus $E^*$ is compared with a rubber composition having a small complex elastic modulus $E^*$, the former has a larger hardness than the latter, and the latter is a viscoelastic material having a smaller hardness and being softer than the former.

In the present embodiment, as described above, complex elastic modulus $E^*1$ at 30° C. of the rubber composition constituting the mount member 10 is larger than complex elastic modulus $E^*2$ at 30° C. of the rubber composition constituting the tread rubber 2A. Accordingly, the mount member 10 has a larger hardness than the tread rubber 2A. With such a relationship, in the tire 1 including the mount member and the electric equipment, the vibration due to the load of the mount member 10 and the like is hardly transferred from the mount member 10 to the tread portion 2. This makes it possible to restrict the noise more effectively during travelling of the vehicle. In addition, since the vibration due the load of the mount member 10 and the electric equipment can be restricted, it is also possible to improve the vehicle running stability.

It is noted that the complex elastic moduli $E^*1$ and $E^*2$ are measurement values measured on the test pieces of the mount member 10 and the tread rubber 2A by a predetermined viscoelastic spectrometer, and, for example, can be measured under measurement conditions: measurement temperature of 30° C., initial strain of 5%, dynamic strain of ±1%, frequency of 10Hz, and stretch deformation mode.

In general, the complex elastic moduli $E^*1$ and $E^*2$ can be adjusted by changing the type or shape of reinforcing agents, such as carbon black and silica, being blended. In addition, they can also be adjusted by changing the type or blend amount of the rubber material, plasticizer such as oil, and vulcanization accelerator. In the present embodiment, too, it is possible to let the relationship $E^*1-E^*2>0$ be satisfied by appropriately changing the type or blend ratio of each material constituting each rubber composition of the tread rubber 2A and the mount member 10, or the type or shape of the reinforcing agent.

A difference ΔE* (=E*1–E*2) between complex elastic modulus E*1 of the mount member 10 and complex elastic modulus E*2 of the tread rubber 2A is preferably at least 2.0 MPa or more. When the difference is 2.0 MPa or more, the noise that occurs during travelling with the tire 1 mounted can be restricted more.

It is noted that the upper limit of the complex elastic modulus E*1 of the mount member 10 is not particularly limited, but it is preferably 15 MPa or less, and more preferably 13 MPa or less. In addition, the lower limit of the complex elastic modulus E*1 of the mount member 10 is not particularly limited, but it is preferably 8 MPa or more, more preferably 9 MPa or more, and still more preferably 10 MPa or more.

In addition, the upper limit of the E*2 of the tread rubber 2A is not particularly limited, but it is preferably 10 MPa or less, and more preferably 9 MPa or less, and still more preferably 8 MPa or less. On the other hand, the lower limit of the complex elastic modulus E*2 of the tread rubber 2A is not particularly limited, too, but it is preferably 4 MPa or more, more preferably 5 MPa or more, and still more preferably 6 MPa or more.

In addition, loss tangent tan δ at 0° C. (hereinafter denoted as tan δ·0° C.) of the rubber composition constituting the tread rubber 2A is preferably 0.30 or more, more preferably 0.33 or more, and still more preferably 0.35 or more. The upper limit value of the loss tangent tan δ·0° C. of the tread rubber 2A is not limited, and the higher the value is, the more preferable it is.

In addition, loss tangent tan δ at 30° C. (hereinafter denoted as tan δ·30° C.) of the rubber composition constituting the tread rubber 2A is preferably 0.13 or less, and more preferably 0.10 or less. The lower limit value of the loss tangent tan δ·30° C. of the tread rubber 2A is not limited, and the lower the value is, the more preferable it is.

It is noted that the loss tangent tan δ·0° C. and the loss tangent tan δ·30° C. are measurement values measured on the test pieces of the mount member 10 and the tread rubber 2A by a predetermined viscoelastic spectrometer. The loss tangent tan δ·0° C. can be measured, for example, under measurement conditions: measurement temperature of 0° C., initial strain of 10%, dynamic strain of ±2.5%, frequency of 10 Hz, and stretch deformation mode. In addition, the loss tangent tan δ·30° C. can be measured, for example, under measurement conditions: measurement temperature of 30° C., initial strain of 5%, dynamic strain of ±1%, frequency of 10 Hz, and stretch deformation mode.

In general, the loss tangent tan δ can be adjusted by changing the type or shape of blended reinforcing agents or blend amount thereof. In addition, it can be adjusted by changing the type or blend amount of the rubber material, plasticizer such as oil, and vulcanization accelerator. In the present embodiment, too, it is possible to adjust the loss tangent tan δ·0° C. and the loss tangent tan δ·30° C. to arbitrary values by appropriately changing the type or blend ratio of each material constituting each rubber composition of the tread rubber 2A and the mount member 10, the type or shape, or the blend amount of the reinforcing agent, or the blend amount of the plasticizer.

In addition, glass transition temperature T1 of the rubber composition constituting the mount member 10 is preferably lower than glass transition temperature T2 of the rubber composition constituting the tread rubber 2A. That is, the glass transition temperature T1 of the mount member 10 and the glass transition temperature T2 of the tread rubber 2A have a relationship represented as T1–T2<0. For example, when the glass transition temperature T1 of the mount member 10 is −35° C., the glass transition temperature T2 of the tread rubber 2A is −30° C. With such a relationship, the kinetic property of polymers of the mount member 10 is always higher than the kinetic property of polymers of the tread rubber 2A. It is considered that with this configuration, when the above-described vibration occurs to the mount member 10, or when a vibration is transferred from the tread portion 2 to the mount member 10, the vibration can be absorbed in the mount member 10, and the noise that occurs from the tire 1 during travelling of the vehicle can be further restricted.

In general, the glass transition temperatures T1 and T2 can be adjusted by changing the type or blend amount of the rubber material being blended, or by changing the type or blend amount of the plasticizer, such as oil, being blended. In the present embodiment, too, it is possible to adjust the glass transition temperatures T1 and T2 to arbitrary values by changing the type or blend amount of the rubber material. It is noted that the glass transition temperature Tg can be measured using a test piece by a predetermined viscoelastic spectrometer. For example, a temperature distribution curve of tan δ may be measured, by using the Eplexor series made by GABO, under measurement conditions: frequency of 10 Hz, initial strain of 10%, amplitude of ±0.5%, and temperature rising speed of 2° C./min, and a tan δ peak temperature indicating the largest tan δ value in the obtained temperature distribution curve may be determined as a glass transition point (Tg).

The tire 1 according to an embodiment of the present disclosure has been described up to now. However, the present disclosure is not limited to the above-described embodiment. The following describes each example of the tire 1 of the present embodiment and comparative examples, with reference to FIG. 5 and Tables 1 to 3.

Examples

In the tires of Examples 1 to 8 and Comparative Examples 1 to 16 described in the following, the blend ratios of each material constituting the rubber compositions of parts, except for the tread portion 2 and the mount member 10, are substantially the same.

The various blend materials used in the rubber compositions constituting the tread portion 2 and the mount member 10 are as follows.

(1) Rubber materials
(a) NR: TSR20
(b) SBR: Europrene SOL R C2525 (content of styrene: 27% by mass, weight average molecular weight: 6.0× $10^5$ g/mol) manufactured by Versalis
(c) BR: UBEPOL-BR150 manufactured by Ube Industries, Ltd.
(d) NBR: Nipol DN401 LL manufactured by Zeon Corporation (2) Additives
(a) Reinforcing agent 1 (silica): ULTRASIL VN3 ($N_2$ SA: 175 $m^2$/g) manufactured by Evonik Degussa
(b) Reinforcing agent 2 (carbon black): DIABLACK N220 manufactured by Mitsubishi Chemical Corporation
(c) Silane coupling agent: Si266 (bis (3-triethoxysilylpropyl) disulfide) manufactured by Degussa
(d) Process oil: Process X-260 manufactured by ENEOS Corporation (d) Mineral oil: DIANA PROCESS PA32 (paraffin type) manufactured by Idemitsu Kosan Co., Ltd.
(e) Resin: SYLVATRAXX 4401 (α-methylstyrene resin) manufactured by Arizona Chemical Company, LLC
(f) Wax: OZOACE-0355 manufactured by Nippon Seiro Co., Ltd.
(g) Anti-aging agent 1: NOCRAC 6C (N-phenyl-N'-(1,3-dimethylbutyl)-p-phenylenediamine) manufactured by Ouchi Shinko Chemical Industrial Co., Ltd.
(h) Anti-aging agent 2: ANTAGE RD (2,2,4-trimethyl-1,2-dihydroquinoline) manufactured by Kawaguchi Chemical Industry Co., Ltd.
(i) Zinc oxide: two types of zinc oxides manufactured by Mitsui Mining & Smelting Co., Ltd.
(j) Stearic acid: camellia oil manufactured by NOF Corporation
(k) Sulfur: HK-200-5 (containing 5% by mass oil) manufactured by Hosoi Chemical Industry Co., Ltd.
(l) Vulcanization accelerator 1: NOCCELER CZ-G(CBS) (N-cyclohexyl-2-benzothiazolylsulfenamide) manufactured by Ouchi Shinko Chemical Industrial Co., Ltd.
(m) Vulcanization accelerator 2: NOCCELER DPG (1,3-diphenylguanidine) manufactured by Ouchi Shinko Chemical Industrial Co., Ltd.

In addition, the tires of Examples 1 to 8 and Comparative Examples 9 to 16 each have the same configuration as the above-described tire 1. That is, in each of the tires, the mount member 10 is mounted to the mounting area A1 on the inner surface 7A corresponding to the crown land portion 24A.

Figure 5:
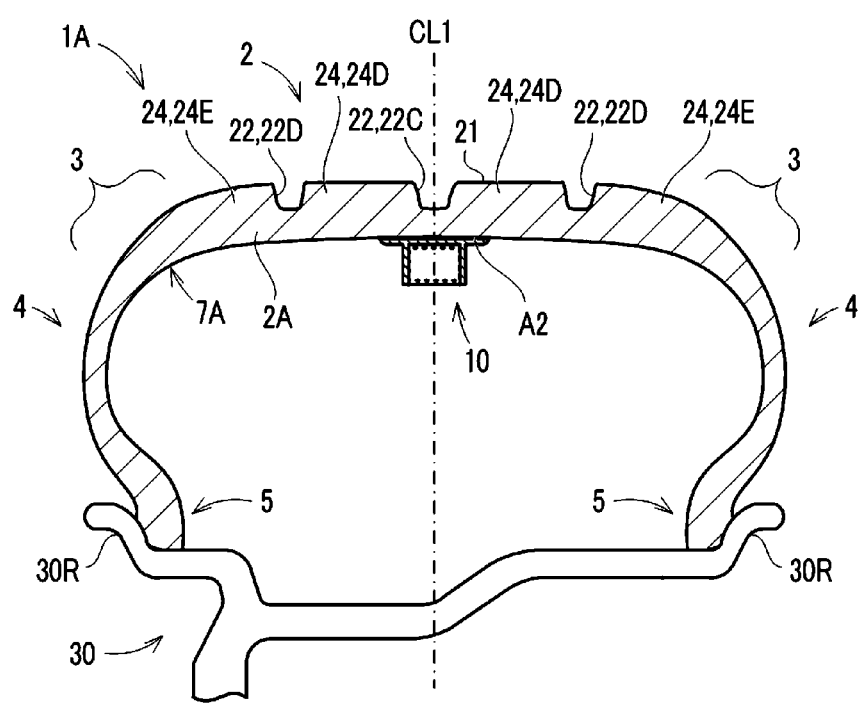
FIG. 5 is a cross-sectional diagram of a tire according to a comparative example.

In addition, the tires of Comparative Examples 1 to 8 are each a tire 1A shown in FIG. 5. FIG. 5 is a diagram showing a configuration of the tire 1A of Comparative Examples 1 to 8, wherein parts thereof that are common to the tire 1 are assigned the same reference signs. In comparison, the tire 1A is different from the configuration of the above-described tire 1 in that three main grooves 22 are formed on the tread surface 21 of the tread portion 2, and the tread portion 2 includes four land portions 24 divided in the width direction D1 by each main groove 22. A main groove 22C is disposed at a center portion of the tread surface 21 crossing the equator plane CL1, and main grooves 22D are respectively disposed at positions a predetermined interval separate outward from the main groove 22C in the width direction D1. As a result, the mount member 10 is disposed at an mounting area A2 on the inner surface 7A corresponding to the main groove 22C.

Table 1 shows blend information R1 to R6 of the tread portion 2 and blend information R7, R8 of the mount member 10 in each tire of Examples 1 to 8 and the Comparative Examples 1 to 16. Each of the blend information R1 to R8 includes blend ratios of rubber compositions and predetermined physical property values of the corresponding members.

TABLE 1

|  |  | Blend information of tread portion | | | | | | Blend information of mount member | |
|---|---|---|---|---|---|---|---|---|---|
|  |  | R1 | R2 | R3 | R4 | R5 | R6 | R7 | R8 |
| Rubber material | NR | 10 | 25 | 15 | 30 | 30 | 40 | 0 | 0 |
|  | SBR | 50 | 45 | 55 | 55 | 55 | 0 | 0 | 0 |
|  | BR | 40 | 30 | 30 | 40 | 15 | 60 | 50 | 50 |
|  | NBR | 0 | 0 | 0 | 0 | 0 | 0 | 50 | 50 |
| Additive | Reinforcing agent 1: silica | 50 | 48 | 40 | 40 | 35 | 70 | 60 | 35 |
|  | Reinforcing agent 2: carbon black | 3 | 3 | 3 | 2 | 2 | 3 | 3 | 3 |
|  | Coupling agent | 5.0 | 4.8 | 4.0 | 4.0 | 3.5 | 7.0 | 6.0 | 3.5 |
|  | Process oil | 10 | 4 | 0 | 0 | 0 | 0 | 3 | 5 |
|  | Mineral oil | 0 | 0 | 0 | 0 | 0 | 20 | 0 | 0 |
|  | Resin | 0 | 4 | 2 | 5 | 8 | 10 | 0 | 0 |
|  | Wax | 1 | 1 | 1 | 1 | 1 | 1 | 1 | 1 |
|  | Anti-aging agent 1 | 2.5 | 2.5 | 2.5 | 2.5 | 2.5 | 2.5 | 2.0 | 2.0 |
|  | Anti-aging agent 2 | 1 | 1 | 1 | 1 | 1 | 2 | 1 | 1 |
|  | Zinc oxide | 2 | 2 | 2 | 2 | 2 | 2 | 3 | 3 |
|  | Stearic acid | 2 | 2 | 2 | 2 | 2 | 2 | 2 | 2 |
|  | Sulfur | 2 | 2 | 2 | 2 | 2 | 2 | 2 | 2 |
|  | Vulcanization accelerator 1 | 2 | 2 | 2 | 2 | 2 | 2 | 1 | 1 |
|  | Vulcanization accelerator 2 | 1 | 1 | 1 | 1 | 1 | 1 | 1 | 1 |
| Physical property | tan δ · 30° C. | 0.15 | 0.15 | 0.10 | 0.10 | 0.10 | 0.20 | 0.25 | 0.20 |
|  | tan δ · 0° C. | 0.25 | 0.28 | 0.30 | 0.35 | 0.35 | 0.25 | — | — |
|  | E* · 30° C. | 8 | 8 | 8 | 7 | 7 | 9 | 12 | 5 |
|  | Tg [° C.] | −35 | −35 | −35 | −35 | −30 | −35 | −35 | −35 |

As shown in Table 1, each of the blend information R1 to R8 shows blend ratios of four types of rubber materials, blend ratios of 14 types of additives, and physical property values of four physical properties. Here, the blend ratio represents, by parts by mass, the blend amount of each material (rubber materials and additives). Specifically, the blend ratio of each material indicates a ratio of the blend amount (parts by mass) of each material when the total parts by mass of one or more types of rubber materials (rubber components) is assumed to be 100. The unit of the blend ratio is represented by phr (per hundred rubber). In addition, the physical properties shown in Table 1 are divided into four types: loss tangent at 30° C. tan δ·30° C.; loss tangent at 0° C. tan δ·0° C.; complex elastic modulus E* at 30° C. (E*·30° C.); and glass transition temperature Tg.

The tires of the examples and the comparative examples were manufactured as follows. First, the additives and the rubber materials other than sulfur and the vulcanization accelerators were blended in accordance with the ratios shown in blend information R1 to R6 of Table 1, and were kneaded for four minutes using a Banbury mixer under the temperature condition of approximately 130° C. Next, sulfur and the vulcanization accelerators were added to the obtained kneaded material in accordance with the ratios shown in Table 1, and were kneaded for four minutes using an open roll under the temperature condition of approximately 80° C., thereby obtaining unvulcanized rubber compositions. The unvulcanized rubber compositions thus obtained were extruded and molded in a shape of the tread portion 2. They were adhered to the other tire members on a tire molding machine to form unvulcanized tires. The unvulcanized tires were press-vulcanized for 10 minutes under the temperature condition of 170° C., thereby manufacturing test tires (tire size: 205/55R16 91V, maximum load capacity: 615 kg).

In addition, the mount members 10 included in the tires of the examples and the comparative examples were manufactured as follows. First, the additives and the rubber materials other than sulfur and the vulcanization accelerators were blended in accordance with the ratios shown in blend information R7 to R8 of Table 1, and were kneaded for four minutes using a predetermined mixer under the temperature condition of approximately 130° C. Next, sulfur and the vulcanization accelerators were added to the obtained kneaded materials in accordance with the ratios shown in Table 1, and were kneaded for four minutes under the temperature condition of approximately 80° C., thereby obtaining unvulcanized rubber compositions. The unvulcanized rubber compositions thus obtained were extruded and molded in a shape of the mount member 10, and they were vulcanized for 10 minutes under the temperature condition of 170° C., thereby manufacturing the mount members 10.

The manufactured mount members 10 are fixed to the inner surfaces of the tires of the examples and the comparative examples together with the electric equipment by the above-described mounting method. Here, with regard to Examples 1 to 7, Comparative Examples 1 to 7, and Comparative Examples 9 to 15, first a surface processing treatment by machine polishing is applied to the mounting area of the inner surface 7A of the tire 1, and then the mount member 10 is mounted to the mounting area together with the electric equipment. In addition, with regard to Example 8 and Comparative Examples 8 and 16, first a surface processing treatment with irradiation of a laser beam is applied to the mounting area of the inner surface 7A of the tire 1, and then the mount member 10 is mounted to the mounting area together with the electric equipment. It is noted that the weight of each obtained tire, including the weight of the electric equipment and the mount member 10, was in the range of 7.7 kg±0.2 kg.

In addition, in the surface processing treatment with irradiation of a laser beam, the rubber surface was scraped off together with the mold releasing agent by using the laser beam adjusted to moving pitch 60 μm and moving speed 4000 mm/s and causing the laser beam to reciprocally move a plurality of times on the mounting area to which the mount member 10 was to be mounted so that the scraping depth (scraping step) was 97 μm.

It is noted that the values of complex elastic modulus E*, loss tangent tan δ, and glass transition temperature Tg shown in Table 1 were obtained by cutting out a test piece of length 20 mm, width 4 mm, and thickness 1 mm from each of the tread portion 2 and the mount member 10 of each of the tires manufactured as described above, and performing measurements thereon using a predetermined viscoelastic spectrometer. With regard to the samples of the tread portion 2, the peripheral direction matches the length direction. In addition, when measurements were performed on the same rubber composition, an average value of the measured values was calculated and written.

Table 2 shows the blend information (R1 to R8), thickness (d1, d2), the complex elastic modulus E*·30° C., the loss tangent tan δ·30° C., the loss tangent tan δ·0° C., glass transition temperature Tg, the difference ΔE* (=E*1—E*2), thickness ratio between thicknesses d1 and d2 (d1/d2), difference ΔT of glass transition temperature (=T1–T2), mounting position of the mount member 10, method of the surface processing treatment applied to the mounting area to which the mount member 10 is mounted, and evaluation value of noise (hereinafter referred to as noise evaluation value) for each of the tread portion 2 and the mount member 10 in the respective tires of Example 1 and Comparative Example 1, Example 2 and Comparative Example 2, Example 3 and Comparative Example 3, Example 4 and Comparative Example 4, Example 5 and Comparative Example 5, Example 6 and Comparative Example 6, Example 7 and Comparative Example 7, and Example 8 and Comparative Example 8. As shown in Table 2, in each of the examples and the comparative examples, the difference ΔE* is plus. That is, the complex elastic modulus E*1 of the mount member 10 is larger than the complex elastic modulus E*2 of the tread portion 2.

It is noted here that in a case where the mount member 10 is mounted to the mounting area A1 corresponding to the land portion 24 of the tread portion 2, the thickness d2 of the tread portion 2 is the thickness of the corresponding land portion 24. In addition, in a case where the mount member 10 corresponds to the main groove 22, namely, when it does not correspond to the land portion 24 of the tread portion 2, the thickness d2 is the thickness of the land portion 24 to which the center position of the mount member 10 is closest.

TABLE 2

| | Part | Blend | Thickness (mm) | E* · 30° C. | tan δ · 30° C. | tan δ · 0° C. | Tg [° C.] | ΔE* | Thickness ratio (d1/d2) | ΔT (T1 − T2) | Mounting position of mount member | Surface processing treatment | Noise evaluation value |
|---|---|---|---|---|---|---|---|---|---|---|---|---|---|
| Example 1 | Tread portion | R6 | 8.0 | 9.0 | 0.20 | 0.25 | −35 | +3.0 | 1.5 | 0 | Area 1 | Machine polishing | 100 |
| | Mount member | R7 | 12.0 | 12.0 | 0.25 | — | −35 | | | | | | |
| Comparative Example 1 | Tread portion | R6 | 8.0 | 9.0 | 0.20 | 0.25 | −35 | +3.0 | 1.5 | 0 | Area 2 | | 70 |
| | Mount member | R7 | 12.0 | 12.0 | 0.25 | — | −35 | | | | | | |
| Example 2 | Tread portion | R1 | 8.0 | 8.0 | 0.15 | 0.25 | −35 | +4.0 | 1.5 | 0 | Area 1 | | 104 |
| | Mount member | R7 | 12.0 | 12.0 | 0.25 | — | −35 | | | | | | |
| Comparative Example 2 | Tread portion | R1 | 8.0 | 8.0 | 0.15 | 0.25 | −35 | +4.0 | 1.5 | 0 | Area 2 | | 73 |
| | Mount member | R7 | 12.0 | 12.0 | 0.25 | — | −35 | | | | | | |
| Example 3 | Tread portion | R2 | 8.0 | 8.0 | 0.15 | 0.28 | −35 | +4.0 | 1.5 | 0 | Area 1 | | 110 |
| | Mount member | R7 | 12.0 | 12.0 | 0.25 | — | −35 | | | | | | |
| Comparative Example 3 | Tread portion | R2 | 8.0 | 8.0 | 0.15 | 0.28 | −35 | +4.0 | 1.5 | 0 | Area 2 | | 76 |
| | Mount member | R7 | 12.0 | 12.0 | 0.25 | — | −35 | | | | | | |
| Example 4 | Tread portion | R3 | 8.0 | 8.0 | 0.10 | 0.30 | −35 | +4.0 | 1.5 | 0 | Area 1 | | 114 |
| | Mount member | R7 | 12.0 | 12.0 | 0.25 | — | −35 | | | | | | |
| Comparative Example 4 | Tread portion | R3 | 8.0 | 8.0 | 0.10 | 0.30 | −35 | +4.0 | 1.5 | 0 | Area 2 | | 80 |
| | Mount member | R7 | 12.0 | 12.0 | 0.25 | — | −35 | | | | | | |
| Example 5 | Tread portion | R4 | 8.0 | 7.0 | 0.10 | 0.35 | −35 | +5.0 | 1.5 | 0 | Area 1 | | 120 |
| | Mount member | R7 | 12.0 | 12.0 | 0.25 | — | −35 | | | | | | |
| Comparative Example 5 | Tread portion | R4 | 8.0 | 7.0 | 0.10 | 0.35 | −35 | +5.0 | 1.5 | 0 | Area 2 | | 86 |
| | Mount member | R7 | 12.0 | 12.0 | 0.25 | — | −35 | | | | | | |
| Example 6 | Tread portion | R4 | 8.0 | 7.0 | 0.10 | 0.35 | −35 | +5.0 | 1.0 | 0 | Area 1 | | 124 |
| | Mount member | R7 | 8.0 | 12.0 | 0.25 | — | −35 | | | | | | |
| Comparative Example 6 | Tread portion | R4 | 8.0 | 7.0 | 0.10 | 0.35 | −35 | +5.0 | 1.0 | 0 | Area 2 | | 90 |
| | Mount member | R7 | 8.0 | 12.0 | 0.25 | — | −35 | | | | | | |
| Example 7 | Tread portion | R5 | 8.0 | 7.0 | 0.10 | 0.35 | −30 | +5.0 | 1.0 | −5 | Area 1 | | 130 |
| | Mount member | R7 | 8.0 | 12.0 | 0.25 | — | −35 | | | | | | |
| Comparative Example 7 | Tread portion | R5 | 8.0 | 7.0 | 0.10 | 0.35 | −30 | +5.0 | 1.0 | −5 | Area 2 | | 92 |
| | Mount member | R7 | 8.0 | 12.0 | 0.25 | — | −35 | | | | | | |
| Example 8 | Tread portion | R5 | 8.0 | 7.0 | 0.10 | 0.35 | −30 | +5.0 | 1.0 | −5 | Area 1 | Laser beam | 135 |
| | Mount member | R7 | 8.0 | 12.0 | 0.25 | — | −35 | | | | | | |
| Comparative Example 8 | Tread portion | R5 | 8.0 | 7.0 | 0.10 | 0.35 | −30 | +5.0 | 1.0 | −5 | Area 2 | | 94 |
| | Mount member | R7 | 8.0 | 12.0 | 0.25 | — | −35 | | | | | | |

It is noted that the noise evaluation values shown in Table 2 were calculated by the following method. The tires of the examples and the comparative examples were mounted on all wheels of a four-wheel vehicle so that the tires were in the normal state, the vehicle was circulated on a test course at the speed of 100 km/h, and the driver evaluated the noise that the driver sensed in the vehicle by a 10-grade evaluation with evaluation points 1 to 10. The test was conducted in a similar manner by 10 drivers, the evaluation points of the drivers were totaled, and with the total evaluation points of Example 1 being assumed to be 100, the total evaluation points of the other examples and comparative examples were indexed. It is noted that when the noise evaluation value is higher, it indicates that the noise sensed by the driver during high-speed travelling was smaller and that it was more excellent.

As shown in Table 2, Example 1 and Comparative Example 1 are different from each other in the number of main grooves of the tread portion 2, and thus they are different from each other in the mounting position of the mount member 10. The difference between Example 1 and Comparative Example 1 is only the mounting position of the mount member 10, and they are substantially the same with regard to the other configurations and specifications. In this case, by comparison between Example 1 in which the mount member 10 is mounted to the mounting area A1 (see FIG. 2) and Comparative Example 1 in which the mount member 10 is mounted to the mounting area A2 (see FIG. 5), it is found that the noise evaluation value of Example 1 is higher than that of Comparative Example 1, namely, the noise generated during high-speed travelling of Example 1 is smaller than that of Comparative Example 1. It is noted that in all of Examples 1 to 8, the mount member 10 is mounted to the mounting area A1 and in all of Comparative Examples 1 to 8, the mount member 10 is mounted to the mounting area A2, and it is understood from Table 2 that in each pair of an Example in Examples 1 to 8 and a corresponding Comparative Example in Comparative Examples 1 to 8, the noise evaluation value of the Example is higher than that of the corresponding Comparative Example.

Example 2 and Comparative Example 2 are different from Example 1 and Comparative Example 1 in that the difference ΔE* between complex elastic modulus E*1 of the mount member 10 and complex elastic modulus E*2 of the tread portion 2 is larger in Example 2 and Comparative Example 2 than in Example 1 and Comparative Example 1 by 1.0. In addition, they are also different in that the loss tangent tan δ·30° C. of the tread portion 2 is 0.15 that is smaller by 0.05. In this case, the noise evaluation value of Example 2 is higher than that of Example 1 by four points, and the noise evaluation value of Comparative Example 2 is higher than that of Comparative Example 1 by three points. This allows us to understand that other conditions being equal, the larger the complex elastic modulus E*1 of the mount member 10 is than the complex elastic modulus E*2 of the tread portion 2, namely, the larger the difference ΔE* is, the higher the noise evaluation value is, namely, the lower the noise generated during high-speed travelling is. In addition, it is understood that when the loss tangent tan δ·30° C. of the tread portion 2 is 0.15, the noise evaluation value is higher and the noise generated during high-speed travelling is lower than when the loss tangent tan δ·30° C. of the tread portion 2 is 0.20.

Example 3 and Comparative Example 3 are different from Example 2 and Comparative Example 2 in that the loss tangent tan δ·0° C. of the tread portion 2 is 0.28 that is larger by 0.03. In this case, the noise evaluation value of Example 3 is higher than that of Example 2 by six points, and the noise evaluation value of Comparative Example 3 is higher than that of Comparative Example 2 by three points. This allows us to understand that other conditions being equal, the larger the loss tangent tan δ·0° C. of the tread portion 2 is, the higher the noise evaluation value is, namely, the lower the noise generated during high-speed travelling is.

Example 4 and Comparative Example 4 are different from Example 3 and Comparative Example 3 in that the loss tangent tan δ·30° C. of the tread portion 2 is that is smaller by 0.05, and that the loss tangent tan δ·0° C. of the tread portion 2 is 0.30 that is larger by 0.02. In this case, the noise evaluation value of Example 4 is higher than that of Example 3 by four points, and the noise evaluation value of Comparative Example 4 is higher than that of Comparative Example 3 by four points. This allows us to understand that other conditions being equal, the smaller the loss tangent tan δ·30° C. is, the higher the noise evaluation value is, and the larger the loss tangent tan δ·0° C. of the tread portion 2 is, the higher the noise evaluation value is, namely, the lower the noise generated during high-speed travelling is.

Example 5 and Comparative Example 5 are different from Example 4 and Comparative Example 4 in that the difference ΔE* is larger by 1.0, and that the loss tangent tan δ·0° C. of the tread portion 2 is higher by 0.05. In this case, the noise evaluation value of Example 5 is higher than that of Example 4 by six points, and the noise evaluation value of Comparative Example 5 is higher than that of Comparative Example 4 by six points. This allows us to understand that other conditions being equal, the larger the difference ΔE* is, the higher the noise evaluation value is, and that the larger the loss tangent tan δ·0° C. of the tread portion 2 is, the higher the noise evaluation value is, namely, the lower the noise generated during high-speed travelling is.

Example 6 and Comparative Example 6 are different from Example 5 and Comparative Example 5 in that the thickness ratio between thickness d1 of the mount member 10 and thickness d2 of the tread portion 2 (d1/d2) is larger. Specifically, they are different in that in Example 5 and Comparative Example 5, the thickness d1 is 1.5 times the thickness d2, whereas in Example 6 and Comparative Example 6, the thickness d1 is equal to the thickness d2. In this case, the noise evaluation value of Example 6 is higher than that of Example 5 by four points, and the noise evaluation value of Comparative Example 6 is higher than that of Comparative Example 5 by four points. This allows us to understand that other conditions being equal, when the thickness ratio (d1/d2) is 1.0, the noise evaluation value is higher and the noise generated during high-speed travelling is lower than when the thickness ratio (d1/d2) is 1.5.

Example 7 and Comparative Example 7 are different from Example 6 and Comparative Example 6 in that the glass transition temperature T1 of the mount member 10 is lower than the glass transition temperature T2 of the rubber composition of the tread portion 2, and the difference ΔT of glass transition temperature (=T1−T2) is −5° C. In this case, the noise evaluation value of Example 7 is higher than that of Example 6 by six points, and the noise evaluation value of Comparative Example 7 is higher than that of Comparative Example 6 by two points. This allows us to understand that other conditions being equal, the lower the glass transition temperature T1 of the mount member 10 is than the glass transition temperature T2 of the rubber composition of the tread portion 2, the higher the noise evaluation value is, namely, the lower the noise generated during high-speed travelling is.

Example 8 and Comparative Example 8 are different from Example 7 and Comparative Example 7 in the method of the surface processing treatment applied to the mounting area to which the mount member 10 is mounted. Specifically, as described above, the surface processing treatment of Example 7 and Comparative Example 7 is processing by machine polishing, whereas the surface processing treatment of Example 8 and Comparative Example 8 is a method of irradiating a laser beam onto the mounting area. In this case, the noise evaluation value of Example 8 is higher than that of Example 7 by five points, and the noise evaluation value of Comparative Example 8 is higher than that of Comparative Example 7 by two points. This allows us to understand that when the surface processing treatment applied to the mounting area of the mount member 10 is irradiation of a laser beam, the noise evaluation value is higher and the noise generated during high-speed travelling is lower than when the surface processing treatment is machine polishing.

Table 3 shows the blend information (R1 to R8), thickness (d1, d2), the complex elastic modulus E*·30° C., the loss tangent tan δ·30° C., the loss tangent tan δ·0° C., glass transition temperature Tg, the difference ΔE* (=E*1−E*2), thickness ratio between thicknesses d1 and d2 (d1/d2), difference ΔT of glass transition temperature (=T1−T2), mounting position of the mount member 10, method of the surface processing treatment applied to the mounting area of the mount member 10, and noise evaluation value for each of the tread portion 2 and the mount member 10 in the respective tires of Example 1 and Comparative Example 9, Example 2 and Comparative Example 10, Example 3 and Comparative Example 11, Example 4 and Comparative Example 12, Example 5 and Comparative Example 13, Example 6 and Comparative Example 14, Example 7 and Comparative Example 15, and Example 8 and Comparative Example 16. As shown in Table 3, blend information of the mount member 10 in Examples 1 to 8 is different from blend information of the mount member 10 in Comparative Examples 9 to 16. As a result, in Examples 1 to 8, the difference ΔE* is plus. That is, the complex elastic modulus E*1 of the mount member 10 is larger than the complex elastic modulus E*2 of the tread portion 2. In addition, in Comparative Examples 9 to 16, the difference ΔE* is minus. That is, the complex elastic modulus E*1 of the mount member 10 is smaller than the complex elastic modulus E*2 of the tread portion 2.

TABLE 3

| | Part | Blend | Thickness (mm) | E* · 30° C. | tan δ · 30° C. | tan δ · 0° C. | Tg [° C.] | ΔE* | Thickness ratio (d1/d2) | ΔT (T1 − T2) | Mounting position of mount member | Surface processing treatment | Noise evaluation value |
|---|---|---|---|---|---|---|---|---|---|---|---|---|---|
| Example 1 | Tread portion | R6 | 8.0 | 9.0 | 0.20 | 0.25 | −35 | +3.0 | 1.5 | 0 | Area A1 | Machine polishing | 100 |
| | Mount member | R7 | 12.0 | 12.0 | 0.25 | — | −35 | | | | | | |
| Comparative Example 9 | Tread portion | R6 | 8.0 | 9.0 | 0.20 | 0.25 | −35 | −4.0 | 1.5 | 0 | | | 70 |
| | Mount member | R8 | 12.0 | 5.0 | 0.20 | — | −35 | | | | | | |
| Example 2 | Tread portion | R1 | 8.0 | 8.0 | 0.15 | 0.25 | −35 | +4.0 | 1.5 | 0 | | | 104 |
| | Mount member | R7 | 12.0 | 12.0 | 0.25 | — | −35 | | | | | | |
| Comparative Example 10 | Tread portion | R1 | 8.0 | 8.0 | 0.15 | 0.25 | −35 | −3.0 | 1.5 | 0 | | | 72 |
| | Mount member | R8 | 12.0 | 5.0 | 0.20 | — | −35 | | | | | | |

TABLE 3-continued

| | Part | Blend | Thickness (mm) | E* · 30° C. | tan δ · 30° C. | tan δ · 0° C. | Tg [° C.] | ΔE* | Thickness ratio (d1/d2) | ΔT (T1 − T2) | Mounting position of mount member | Surface processing treatment | Noise evaluation value |
|---|---|---|---|---|---|---|---|---|---|---|---|---|---|
| Example 3 | Tread portion | R2 | 8.0 | 8.0 | 0.15 | 0.28 | −35 | +4.0 | 1.5 | 0 | | | 110 |
| | Mount member | R7 | 12.0 | 12.0 | 0.25 | — | −35 | | | | | | |
| Comparative Example 11 | Tread portion | R2 | 8.0 | 8.0 | 0.15 | 0.28 | −35 | −3.0 | 1.5 | 0 | | | 78 |
| | Mount member | R8 | 12.0 | 5.0 | 0.20 | — | −35 | | | | | | |
| Example 4 | Tread portion | R3 | 8.0 | 8.0 | 0.10 | 0.30 | −35 | +4.0 | 1.5 | 0 | | | 114 |
| | Mount member | R7 | 12.0 | 12.0 | 0.25 | — | −35 | | | | | | |
| Comparative Example 12 | Tread portion | R3 | 8.0 | 8.0 | 0.10 | 0.30 | −35 | −3.0 | 1.5 | 0 | | | 82 |
| | Mount member | R8 | 12.0 | 5.0 | 0.20 | — | −35 | | | | | | |
| Example 5 | Tread portion | R4 | 8.0 | 7.0 | 0.10 | 0.35 | −35 | +5.0 | 1.5 | 0 | | | 120 |
| | Mount member | R7 | 12.0 | 12.0 | 0.25 | — | −35 | | | | | | |
| Comparative Example 13 | Tread portion | R4 | 8.0 | 7.0 | 0.10 | 0.35 | −35 | −2.0 | 1.5 | 0 | | | 86 |
| | Mount member | R8 | 12.0 | 5.0 | 0.20 | — | −35 | | | | | | |
| Example 6 | Tread portion | R4 | 8.0 | 7.0 | 0.10 | 0.35 | −35 | +5.0 | 1.0 | 0 | | | 124 |
| | Mount member | R7 | 8.0 | 12.0 | 0.25 | — | −35 | | | | | | |
| Comparative Example 14 | Tread portion | R4 | 8.0 | 7.0 | 0.10 | 0.35 | −35 | −2.0 | 1.0 | 0 | | | 92 |
| | Mount member | R8 | 8.0 | 5.0 | 0.20 | — | −35 | | | | | | |
| Example 7 | Tread portion | R5 | 8.0 | 7.0 | 0.10 | 0.35 | −30 | +5.0 | 1.0 | −5 | | | 130 |
| | Mount member | R7 | 8.0 | 12.0 | 0.25 | — | −35 | | | | | | |
| Comparative Example 15 | Tread portion | R5 | 8.0 | 7.0 | 0.10 | 0.35 | −30 | −2.0 | 1.0 | −5 | | | 94 |
| | Mount member | R8 | 8.0 | 5.0 | 0.20 | — | −35 | | | | | | |
| Example 8 | Tread portion | R5 | 8.0 | 7.0 | 0.10 | 0.35 | −30 | +5.0 | 1.0 | −5 | | Laser beam | 135 |
| | Mount member | R7 | 8.0 | 12.0 | 0.25 | — | −35 | | | | | | |
| Comparative Example 16 | Tread portion | R5 | 8.0 | 7.0 | 0.10 | 0.35 | −30 | −2.0 | 1.0 | −5 | | | 96 |
| | Mount member | R8 | 8.0 | 5.0 | 0.20 | — | −35 | | | | | | |

It is noted that the noise evaluation values shown in Table 3 were calculated by the same method as the noise evaluation values shown in Table 2.

As shown in Table 3, in each of Example 1 and Comparative Example 9, the mount member 10 is mounted to the mounting area A1 (see FIG. 2). On the other hand, in Example 1, the difference ΔE* is plus, namely, the complex elastic modulus E*1 of the mount member 10 is larger than the complex elastic modulus E*2 of the tread portion 2. However, in Comparative Example 9, the difference ΔE* is minus, namely, the complex elastic modulus E*1 of the mount member 10 is smaller than the complex elastic modulus E*2 of the tread portion 2. The difference between Example 1 and Comparative Example 9 is only the difference in size relation between the complex elastic modulus E*1 of the mount member 10 and the complex elastic modulus E*2 of the tread portion 2, and they are substantially the same with regard to the other configurations and specifications. In this case, by comparison between Example 1 in which the difference ΔE* is plus and Comparative Example 9 in which the difference ΔE* is minus, it is found that the noise evaluation value of Example 1 is higher than that of Comparative Example 9, namely, the noise of Example 1 is lower than that of Comparative Example 9. It is noted that in all of Examples 1 to 8, the difference ΔE* is plus and in all of Comparative Examples 9 to 16, the difference ΔE* is minus, and it is understood from Table 3 that in each pair of an Example in Examples 1 to 8 and a corresponding Comparative Example in Comparative Examples 9 to 16, the noise evaluation value of the Example is higher than that of the corresponding Comparative Example.

Example 2 and Comparative Example 10 are different from Example 1 and Comparative Example 9 in that the loss tangent tan δ·30° C. of the tread portion 2 is that is smaller by 0.05, and that the difference ΔE* is +4.0 that is larger by 1.0. In this case, the noise evaluation value of Example 2 is higher than that of Example 1 by four points, and the noise evaluation value of Comparative Example 10 is higher than that of Comparative Example 9 by two points. This allows us to understand that other conditions being equal, the larger the difference ΔE* is, the higher the noise evaluation value is, and the smaller the loss tangent tan δ·30° C. is, the higher the noise evaluation value is, namely, the lower the noise generated during high-speed travelling is.

Example 3 and Comparative Example 11 are different from Example 2 and Comparative Example 10 in that the loss tangent tan δ·0° C. of the tread portion 2 is that is larger by 0.03. In this case, the noise evaluation value of Example 3 is higher than that of Example 2 by six points, and the noise evaluation value of Comparative Example 11 is higher than that of Comparative Example 10 by six points. This allows us to understand that other conditions being equal, the larger the loss tangent tan δ·0° C. is, the higher the noise evaluation value is, namely, the lower the noise generated during high-speed travelling is.

Example 4 and Comparative Example 12 are different from Example 3 and Comparative Example 11 in that the loss tangent tan δ·30° C. of the tread portion 2 is 0.10 that is smaller by 0.05, and that the loss tangent tan δ·0° C. of the tread portion 2 is 0.30 that is larger by 0.02. In this case, the noise evaluation value of Example 4 is higher than that of Example 3 by four points, and the noise evaluation value of Comparative Example 12 is higher than that of Comparative Example 11 by four points. This allows us to understand that other conditions being equal, the smaller the loss tangent tan δ·30° C. is, the higher the noise evaluation value is, and the larger the loss tangent tan δ·0° C. of the tread portion 2 is, the higher the noise evaluation value is, namely, the lower the noise generated during high-speed travelling is.

Example 5 and Comparative Example 13 are different from Example 4 and Comparative Example 12 in that the difference ΔE* (=E*1−E*2) between complex elastic modulus E*1 of the mount member 10 and complex elastic modulus E*2 of the tread portion 2 is larger by 1.0. In this case, the noise evaluation value of Example 5 is higher than that of Example 4 by six points, and the noise evaluation value of Comparative Example 13 is higher than that of Comparative Example 12 by four points. This allows us to understand that other conditions being equal, the larger the complex elastic modulus ΔE*1 of the mount member 10 is than the complex elastic modulus ΔE*2 of the tread portion 2, the higher the noise evaluation value is, namely, the lower the noise generated during high-speed travelling is.

Example 6 and Comparative Example 14 are different from Example 5 and Comparative Example 13 in that the thickness ratio between thickness d1 of the mount member 10 and thickness d2 of the tread portion 2 (d1/d2) is larger. Specifically, in Example 5 and Comparative Example 13, the thickness d1 is 1.5 times the thickness d2, whereas in Example 6 and Comparative Example 14, the thickness d1 is equal to the thickness d2. In this case, the noise evaluation value of Example 6 is higher than that of Example 5 by four points, and the noise evaluation value of Comparative Example 14 is higher than that of Comparative Example 13 by six points. This allows us to understand that other conditions being equal, when the thickness ratio (d1/d2) is 1.0, the noise evaluation value is higher and the noise generated during high-speed travelling is lower than when the thickness ratio (d1/d2) is 1.5.

Example 7 and Comparative Example 15 are different from Example 6 and Comparative Example 14 in that the glass transition temperature T1 of the mount member 10 is lower than the glass transition temperature T2 of the tread portion 2, and the difference ΔT of glass transition temperature (=T1−T2) is −5° C. In this case, the noise evaluation value of Example 7 is higher than that of Example 6 by six points, and the noise evaluation value of Comparative Example 15 is higher than that of Comparative Example 14 by two points. This allows us to understand that other conditions being equal, the lower the glass transition temperature T1 of the mount member 10 is than the glass transition temperature T2 of the tread portion 2, the higher the noise evaluation value is, namely, the lower the noise generated during high-speed travelling is.

Example 8 and Comparative Example 16 are different from Example 7 and Comparative Example 15 in the method of the surface processing treatment applied to the mounting area to which the mount member 10 is mounted. Specifically, as described above, the surface processing treatment of Example 7 and Comparative Example 15 is processing by machine polishing, whereas the surface processing treatment of Example 8 and Comparative Example 16 is a method of irradiating a laser beam onto the mounting area. In this case, the noise evaluation value of Example 8 is higher than that of Example 7 by five points, and the noise evaluation value of Comparative Example 16 is higher than that of Comparative Example 15 by two points. This allows us to understand that when the surface processing treatment applied to the mounting area of the mount member 10 is irradiation of a laser beam, the noise evaluation value is higher and the noise generated during high-speed travelling is lower than when the surface processing treatment is machine polishing.

The embodiments of the present disclosure described above include the following disclosure items (1) to (12).

Present disclosure (1) is a tire including: a tread portion including a land portion divided by a recessed groove formed on a surface; and a mount member which is provided on a tire inner surface that is on an inner side of the tread portion, and to which electric equipment can be attached. In the tire of the present disclosure (1), the mount member is disposed on the tire inner surface at a mounting position corresponding to the land portion. Complex elastic modulus E*1 of a first rubber composition constituting the mount member is larger than complex elastic modulus E*2 of a second rubber composition constituting the tread portion. With this configuration, even in a tire having a mount member attached with electric equipment, it is possible to restrict a noise caused by load of the mount member and the electric equipment.

Present disclosure (2) is the tire according to the present disclosure (1), wherein a difference between the complex elastic modulus E*1 at 30° C. of the first rubber composition and the complex elastic modulus E*2 at 30° C. of the second rubber composition is at least 2.0 MPa or more.

Present disclosure (3) is the tire according to the present disclosure (1) or (2), wherein loss tangent tan δ at 0° C. of the second rubber composition constituting the tread portion is 0.30 or more. Present disclosure (4) is the tire according to any one of the present disclosures (1) to (3), wherein the loss tangent tan δ at 30° C. of the second rubber composition constituting the tread portion is 0.13 or less.

Present disclosure (5) is the tire according to present disclosure (4), wherein the loss tangent tan δ at 30° C. of the second rubber composition constituting the tread portion is 0.10 or less.

Present disclosure (6) is the tire according to any one of the present disclosures (1) to (5), wherein glass transition temperature T1 of the first rubber composition of the mount member is lower than glass transition temperature T2 of the second rubber composition of the tread portion.

Present disclosure (7) is the tire according to any one of the present disclosures (1) to (6), wherein maximum thickness d1 of the mount member in a direction perpendicular to the tire inner surface and thickness d2 of the land portion of the tread portion satisfy a formula (1) shown below:

$$0.25 \times d2 < d1 < 1.25 \times d2 \qquad (1).$$

Present disclosure (8) is the tire according to any one of the present disclosures (1) to (7), wherein the recessed groove includes at least two peripheral-direction grooves that are formed on both sides of a tire equator plane and extend along a tire peripheral direction, and the mount member is disposed on the tire inner surface at the mounting position corresponding to the land portion sandwiched by the two peripheral-direction grooves.

Present disclosure (9) is the tire according to any one of the present disclosures (1) to (8), wherein the mount member is fixed to the mounting position in a state where a skin of either or both of a mounting surface of the tire inner surface including the mounting position and an adhesion surface of the mount member that is adhered to the tire inner surface, has been removed by a predetermined surface processing treatment. With this configuration, it is possible to enhance the mounting strength of the mount member at the tire inner surface. It is noted that examples of the method for fixing the mount member include a method for fixing by welding and a method for fixing by an adhesive.

Present disclosure (10) is the tire according to the present disclosure (9), wherein the surface processing treatment is a treatment to irradiate a laser beam. More preferably, the surface processing treatment is a treatment to process and make the mounting surface in the tire inner surface or the contact surface of the mount member an even surface by irradiation of the laser beam. With this configuration, it is possible to improve the adhesion between the mounting surface and the contact surface, thereby enhancing the mounting strength of the mount member at the tire inner surface. In addition, since it also removes the mold releasing agent adhered to each surface, the mounting strength is further improved.

Present disclosure (11) is the tire according to any one of the present disclosures (1) to (10), wherein the tire includes two or more mount members, and the two or more mount members are disposed on the tire inner surface at mounting positions respectively corresponding to two land portions that are separated from each other in a tire width direction by a tire equator plane.

Present disclosure (12) is the tire according to any one of the present disclosures (1) to (11), wherein the tire is a tire for passenger car. That is, the present disclosure (12) is suitably used as a tire for passenger car mounted on a passenger car.

The invention claimed is:

1. A tire comprising:
   a tread portion including a plurality of land portions divided by at least one recessed groove formed on a surface; and
   a mount member which is provided on a tire inner surface that is on an inner side of the tread portion, and to which electric equipment can be attached, wherein
   the mount member is disposed on the tire inner surface at a mounting position corresponding to a land portion of the plurality of land portions,
   complex elastic modulus $E^*1$ at 30° C. of a first rubber composition constituting the mount member is 12.0, and complex elastic modulus $E^*2$ at 30° C. of a second rubber composition constituting the tread portion is 7.0, and
   glass transition temperature T1 of the first rubber composition of the mount member is −35° C., and glass transition temperature T2 of the second rubber composition of the tread portion is −30° C.

2. The tire according to claim 1, wherein loss tangent tanδ at 0° C. of the second rubber composition constituting the tread portion is 0.30 or more.

3. The tire according to claim 1, wherein the loss tangent tanδ at 30° C. of the second rubber composition constituting the tread portion is 0.13 or less.

4. The tire according to claim 3, wherein the loss tangent tanδ at 30° C. of the second rubber composition constituting the tread portion is 0.10 or less.

5. The tire according to claim 1, wherein maximum thickness d1 of the mount member in a direction perpendicular to the tire inner surface and thickness d2 of the land portion of the tread portion satisfy a formula (1) shown below:

$$0.25 \times d2 < d1 < 1.25 \times d2 \quad (1).$$

6. The tire according to claim 1, wherein
   the at least one recessed groove includes at least two peripheral-direction grooves that are formed on both sides of a tire equator plane and extend along a tire peripheral direction, and
   the mount member is disposed on the tire inner surface at the mounting position corresponding to the land portion sandwiched by the two peripheral-direction grooves.

7. The tire according to claim 1, wherein
   the mount member is fixed to the mounting position in a state where a skin of either or both of a mounting surface of the tire inner surface including the mounting position and an adhesion surface of the mount member that is adhered to the tire inner surface, has been removed by a predetermined surface processing treatment.

8. The tire according to claim 7, wherein the surface processing treatment is a treatment to irradiate a laser beam.

9. The tire according to claim 1, wherein
   the tire comprises two or more mount members, and
   the two or more mount members are disposed on the tire inner surface at mounting positions respectively corresponding to two land portions of the plurality of land portions that are separated from each other in a tire width direction by a tire equator plane.

10. The tire according to claim 1, wherein the tire is a tire for a passenger car.

* * * * *